(12) United States Patent
Colom Ikuno et al.

(10) Patent No.: US 12,501,253 B2
(45) Date of Patent: Dec. 16, 2025

(54) PROVIDING COMMUNICATION SERVICES TO A USER EQUIPMENT USING A USER EQUIPMENT SUBSCRIPTION OF A FIRST NETWORK AND SUBSCRIPTION IDENTIFIER INFORMATION OF A SECOND NETWORK

(71) Applicant: Deutsche Telekom AG, Bonn (DE)

(72) Inventors: Josep Colom Ikuno, Korneuburg (AT); Sven Lachmund, Munich (DE); Dieter Gludovacz, Trumau (AT); Mari Melander, Bonn (DE); Roland Jesske, Laudenbach (DE); Johannes Achter, Kleinroetz (AT)

(73) Assignee: Deutsche Telekom AG, Bonn (DE)

( * ) Notice: Subject to any disclaimer, the term of this patent is extended or adjusted under 35 U.S.C. 154(b) by 361 days.

(21) Appl. No.: 18/179,403

(22) Filed: Mar. 7, 2023

(65) Prior Publication Data

US 2023/0292100 A1 Sep. 14, 2023

(30) Foreign Application Priority Data

Mar. 9, 2022 (EP) ..................................... 22161128

(51) Int. Cl.
*H04W 8/12* (2009.01)
*H04W 8/20* (2009.01)
*H04W 12/06* (2021.01)

(52) U.S. Cl.
CPC ............... *H04W 8/12* (2013.01); *H04W 8/20* (2013.01); *H04W 12/06* (2013.01)

(58) Field of Classification Search
CPC ......... H04W 8/00; H04W 8/06; H04W 8/065; H04W 8/12; H04W 8/20; H04W 12/06
See application file for complete search history.

(56) References Cited

U.S. PATENT DOCUMENTS

| 11,184,356 | B1* | 11/2021 | Tandon | ................ | H04L 67/141 |
| 2019/0098502 | A1* | 3/2019 | Torvinen | ................ | H04L 9/083 |
| 2021/0321303 | A1* | 10/2021 | Nair | .................... | H04L 63/0281 |

FOREIGN PATENT DOCUMENTS

EP 3528456 A1 8/2019

* cited by examiner

*Primary Examiner* — Lester G Kincaid
(74) *Attorney, Agent, or Firm* — Leydig, Voit & Mayer, Ltd.

(57) ABSTRACT

In order to provide the communication services to a user equipment comprising or applying secure edge protection proxy authentication: in a first step, a network function of a visited telecommunications network receives a request related to the user equipment, triggering a message towards a third secure edge protection proxy entity or functionality; and in a second step, the third secure edge protection proxy entity or functionality accesses a first secure edge protection proxy entity or functionality in an authenticated manner such that a message related to a second network identifier information is able to be sent, by the visited telecommunications network, to a network function in a first telecommunications network and accepted by the first telecommunications network.

13 Claims, 5 Drawing Sheets

PROVIDING COMMUNICATION SERVICES TO A USER EQUIPMENT USING A USER EQUIPMENT SUBSCRIPTION OF A FIRST NETWORK AND SUBSCRIPTION IDENTIFIER INFORMATION OF A SECOND NETWORK

CROSS-REFERENCE TO PRIOR APPLICATIONS

Priority is claimed to European Patent Application No. EP 22161128.8, filed on Mar. 9, 2022, the entire disclosure of which is hereby incorporated by reference herein.

FIELD

The present invention relates a method for providing communication services to a user equipment involving first and second telecommunications networks (composed of network functions and being able to be accessed by or via a first and second secure edge protection proxy entity or functionality), wherein, in case that the user equipment uses or is connected to an access network of a visited telecommunications network, the visited telecommunications network composed of network functions likewise comprising a third secure edge protection proxy entity or functionality, the user equipment uses a user equipment subscription including subscriber permanent identifier information that is related to or assigned to the first network while the respective subscription identifier information comprises the second network identifier information.

Furthermore, the present invention relates to a system for providing communication services to a user equipment involving first and second telecommunications networks (composed of network functions and being able to be accessed by or via a first and second secure edge protection proxy entity or functionality), wherein, in case that the user equipment uses or is connected to an access network of a visited telecommunications network, the visited telecommunications network composed of network functions likewise comprising a third secure edge protection proxy entity or functionality, the user equipment uses a user equipment subscription including subscriber permanent identifier information that is related to or assigned to the first network while the respective subscription identifier information comprises the second network identifier information.

Furthermore, the present invention relates to a program and to a computer-readable medium for providing communication services to a user equipment according to a method according to the invention.

BACKGROUND

In conventional telecommunications networks, it is possible for network operators to provide users with connectivity, e.g. machine type communication or machine-to-machine communication (or M2M connectivity), certain customers, via relying on a solution whereby network subscriptions (e.g. subscriber identity module cards, or SIM cards) of a certain telecommunications network (e.g. a public land mobile network in, say, a country or region B) are used while the corresponding core network infrastructure (serving these customers) is placed in (or related to) another telecommunications network (e.g. a public land mobile network in a country or region A), whereas each network is identified by a network identity. It is thereby possible to offer best-coverage in the area of the other telecommunications network (i.e. in country or region A), especially in case that limitations apply regarding national roaming, or in case that no national roaming is allowed, as it is the case, e.g., in some European countries by using a network in a different country and thus a setup providing permanent or quasi-permanent roaming to users.

An example of such an implementation includes, e.g., cars using a SIM containing a SIM from an American operator while for cars sold in Europe the core network (serving these customers) is placed in Europe (e.g. for latency, organizational or regulatory reasons).

However, with the mandatory use of security, authentication and/or concealment mechanisms or functionalities, such as the use of secure edge protection proxy entities or functionalities and/or the use of subscription concealed identifiers, it is more and more difficult, if not impossible, to realize such an implementation of users or subscribers of a telecommunications network being served by a specific core network (e.g. a public land mobile network in country or region A) while still using a subscriber identity comprising a network identity associated with another telecommunications network (e.g. a public land mobile network in country or region B), especially when in a roaming situation, i.e. connected to a visited network (e.g. in country or region C).

SUMMARY

In an exemplary embodiment, the present invention provides a method for providing communication services to a user equipment involving a first telecommunications network composed of network functions and a second telecommunications network composed of network functions. The first telecommunications network uses or is assigned to a first network identifier information and is able to be accessed by or via a first secure edge protection proxy entity or functionality, and the second telecommunications network uses or is assigned to a second network identifier information and is able to be accessed by or via a second secure edge protection proxy entity or functionality. In case that the user equipment uses or is connected to an access network of a visited telecommunications network, the visited telecommunications network composed of network functions likewise comprising a third secure edge protection proxy entity or functionality, the user equipment uses a user equipment subscription including subscriber permanent identifier information that is related to or assigned to the first network while the respective subscription identifier information comprises the second network identifier information. Either subscriber permanent identifier information is included by the user equipment for identification and/or routing purposes in messages towards the visited telecommunications network, or subscription concealed identifier information containing information derived from the subscriber permanent identifier and/or a routing indicator information is included by the user equipment for identification and/or routing purposes in messages towards the visited telecommunications network. Messages between, on the one hand, the visited telecommunications network and, on the other hand, the first telecommunications network or the second telecommunications network or both of the first and second telecommunications networks are forwarded via a bidirectional channel between, on the one hand, the third secure edge protection proxy entity or functionality and, on the other hand, the first secure edge protection proxy entity or functionality or the second secure edge protection proxy entity or functionality or both of the first and second secure edge protection proxy entities or functionalities, and vice-versa. Deconcealment of subscription concealed identifier information into a subscriber permanent identifier information is performed by the first telecommunications network. In order to provide the communication services to the user equipment comprising or applying secure edge protection proxy authentication, the method comprises the following steps: in a first step, a network function of the visited telecommunications network receives a request related to the user equipment, triggering a message towards the third secure edge protection proxy entity or functionality; and in a second step, the third secure edge protection proxy entity or functionality accesses the first secure edge protection proxy entity or functionality in an authenticated manner such that a message related to the second network identifier information is able to be sent, by the visited telecommunications network, to a network function in the first telecommunications network and accepted by the first telecommunications network.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
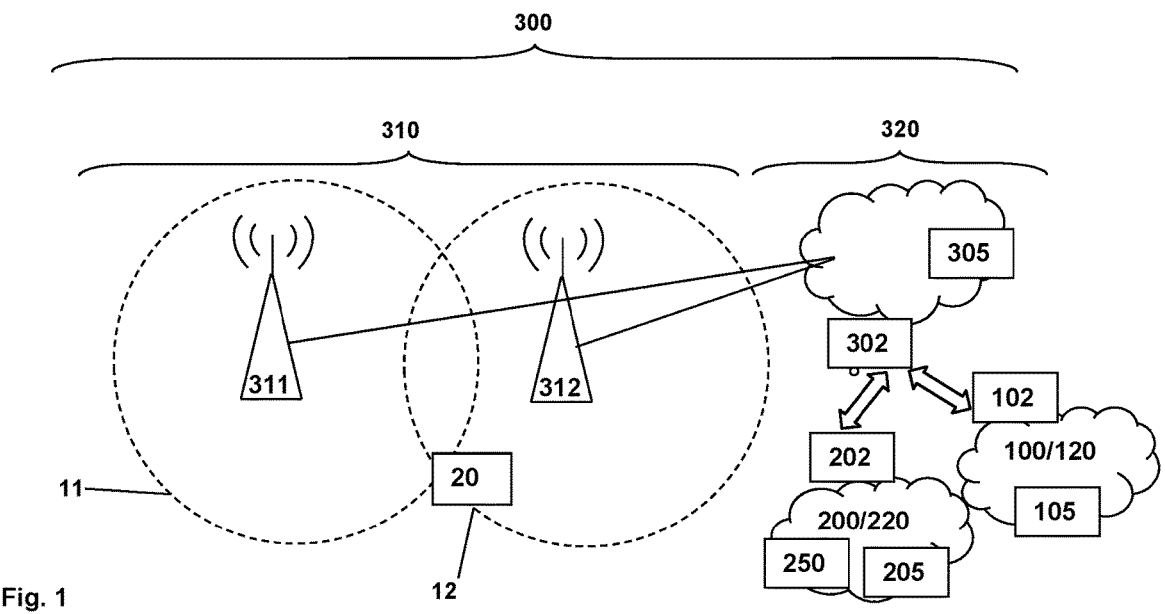
FIG. 1 schematically illustrates a user equipment being connected to a visited telecommunications network comprising an access network and a core network, and being connected to a first and a second telecommunications network, the telecommunications networks especially communicating via secure edge protection proxy entities or functionalities.

Exemplary embodiments of the present invention provide technically simple, effective and cost effective solutions for providing communication services to a user equipment involving first and second telecommunications networks using or being assigned to, respectively, a first and second network identifier information, wherein, in case that the user equipment uses or is connected to an access network of a visited telecommunications network, the user equipment uses a user equipment subscription, especially including subscriber permanent identifier information, that is related or assigned to the first network while the respective subscription identifier information comprises the second network identifier information and despite of the telecommunications networks communicating via secure edge protection proxy entities or functionalities an authenticated communication is possible. Exemplary embodiments of the present invention further provide a corresponding system, and a corresponding program and computer-readable medium.

Exemplary embodiments of the present invention provide a method for providing communication services to a user equipment involving a first telecommunications network composed of network functions and a second telecommunications network composed of network functions, wherein the first telecommunications network uses or is assigned to a first network identifier information and is able to be accessed by or via a first secure edge protection proxy entity or functionality, and wherein the second telecommunications network uses or is assigned to a second network identifier information and is able to be accessed by or via a second secure edge protection proxy entity or functionality, wherein, in case that the user equipment uses or is connected to an access network of a visited telecommunications network, the visited telecommunications network composed of network functions likewise comprising a third secure edge protection proxy entity or functionality, the user equipment uses a user equipment subscription including subscriber permanent identifier information that is related to or assigned to the first network while the respective subscription identifier information comprises the second network identifier information, wherein either subscriber permanent identifier information is included by the user equipment for identification and/or routing purposes in messages towards the visited telecommunications network, or subscription concealed identifier information containing information derived from the subscriber permanent identifier and/or a routing indicator information is included by the user equipment for identification and/or routing purposes in messages towards the visited telecommunications network, wherein messages between, on the one hand, the visited telecommunications network and, on the other hand, the first or the second telecommunications network or both of the first and the second telecommunications network are forwarded via a bidirectional channel between, on the one hand, the third secure edge protection proxy entity or functionality and, on the other hand, the first or second secure edge protection proxy entity or functionality or both of the first and second secure edge protection proxy entity or functionality, and vice-versa, wherein deconcealment of subscription concealed identifier information into a subscriber permanent identifier information is performed by the first telecommunications network, wherein, in order to provide the communication services to the user equipment comprising or applying secure edge protection proxy authentication, the method comprises the following steps:

in a first step, a network function of the visited telecommunications network receives a request related to the user equipment, triggering a message towards the third secure edge protection proxy entity or functionality, in a second step, the third secure edge protection proxy entity or functionality accesses the first secure edge protection proxy entity or functionality in an authenticated manner, especially such that a message related to the second network identifier information is able to be sent, by the visited telecommunications network, to a network function in the first telecommunications network and accepted by the first telecommunications network.

It is thereby advantageously possible according to the present invention that a user equipment uses or is connected to an access network of a visited telecommunications network and the user equipment uses a user equipment subscription that is related or assigned to the first network while the respective subscription identifier information comprises the second network identifier information, and that despite the telecommunications networks communicating via secure edge protection proxy entities or functionalities and/or the use of concealed identifiers, an authenticated communication is possible.

In other words, it is possible to realize an implementation such that both a user equipment, while using a network identifier information of one telecommunications network, is able to be served by another telecommunications network, especially in case of M2M communication, and additionally such an implementation is in accordance with 5G mechanisms, especially maintaining 5G security, i.e. an exchange of (control plane) messages in an authenticated manner between the telecommunications networks (despite using a 'wrong' network identifier information).

According to the present invention, it is advantageously possible and preferred that the first secure edge protection proxy entity or functionality is reachable by the third secure edge protection proxy entity or functionality via a first domain and/or host name related to the first network identifier information;

wherein the second secure edge protection proxy entity or functionality is reachable, by the third secure edge protection proxy entity or functionality, via a second domain and/or host name related to the second network identifier information;

wherein a specific network function in the first telecommunications network is reachable, by a consumer network function in the visited telecommunications network, via a further first domain and/or host name related to the specific network function and the first network identifier information;

wherein a further specific network function in the second telecommunications network is reachable, by a consumer network function in the visited telecommunications network, via a further second domain and/or host name related to the further specific network function and the second network identifier information, wherein especially in order to provide the communication services to the user equipment using service-based interfaces and/or a network repository function, a network function service is requested and/or provided, by the specific network function of the first telecommunications network, to the consumer network function of the visited telecommunications network.

It is thereby advantageously possible to realize and implement a method according to the invention in a comparatively simple and efficient manner.

According to the present invention, it is furthermore advantageously possible and preferred that, in or during the first step, the request related to the user equipment is especially triggered by the user equipment accessing the visited telecommunications network to connect or to be connected thereto.

According to the present invention, it is furthermore advantageously possible and preferred that—especially according to a first solution or embodiment—, in order for the third secure edge protection proxy entity or functionality accessing the first secure edge protection proxy entity or functionality in an authenticated manner, prior to the first secure edge protection proxy entity or functionality being accessed by the third secure edge protection proxy entity or functionality, the third secure edge protection proxy entity or functionality accesses the second secure edge protection proxy entity or functionality related to the user equipment, especially via transmitting a network function discovery query message to the second secure edge protection proxy entity or functionality, wherein the second secure edge protection proxy entity or functionality transmits an indication that the first secure edge protection proxy entity or functionality is to be accessed regarding the requested network function, wherein especially the second telecommunications network comprises a network repository function related to the second network identifier information, and the method comprises the following steps:

in a step A, the visited telecommunications network receives, from the user equipment, a message containing subscription concealed identifier information and/or routing indicator information, in a step B, the visited telecommunications network queries the network repository function for a network function capable of deconcealing the received concealed identifier information and/or routing indicator information, in a step C, the network repository function returns information related to the specific network function and including the further first domain and/or host name related to the first network identifier information, in a step D, the visited telecommunications network is configured to forward, based on the first network identifier information contained within the further first domain and/or host name, a message containing the subscription concealed identifier information and/or the routing indicator information to the specific network function, especially while this message contains a subscription concealed identifier information and/or a routing indicator information related to the second network identifier information and especially thereby realizing the second step, e.g. by forwarding a message requesting the deconcealment of the subscription concealed identifier received from the user equipment in the first step.

Furthermore, it is advantageously possible and preferred according to the present invention, and likewise regarding or in view of the first solution or embodiment, that the third secure edge protection proxy entity or functionality accessing the first secure edge protection proxy entity or functionality in an authenticated manner, especially step D, requires the third secure edge protection proxy entity or functionality to have received or to be able to access secure edge protection proxy information, especially comprising an allow redirection-to-indication containing network identifier information and/or domain and/or host name information, and/or an allow-redirection-from-indication containing network identifier information and/or domain and/or host name information regarding the first and/or second secure edge protection proxy entity or functionality and/or regarding the first and/or second telecommunications network, wherein especially the secure edge protection proxy information is accessed from a secure edge protection proxy metadata repository, wherein especially only if the allow-redirection-to-indication from the second secure edge protection proxy entity or functionality includes the first network identifier information and/or domain and/or host name information related to the first telecommunications network, or only if the allow-redirection-from-indication from the first secure edge protection proxy entity or functionality includes the second network identifier information and/or domain and/or host name information related to the second telecommunications network, or only if both the allow-redirection-to-indication from the second secure edge protection proxy entity or functionality includes the first network identifier information and/or domain and/or host name information related to the first telecommunications network and the allow-redirection-from-indication from the first secure edge protection proxy entity or functionality includes the second network identifier information, and/or domain and/or host name information related to the second telecommunications network.

It is thereby advantageously possible to realize and implement a method according to the invention in a comparatively simple and efficient manner.

Furthermore, it is advantageously possible and preferred according to the present invention that—especially according to a second solution or embodiment—, in order for the third secure edge protection proxy entity or functionality accessing the first secure edge protection proxy entity or functionality in an authenticated manner, the third telecommunications network is configured to use a domain and/or host name resolver entity or functionality, and the method comprises the following steps:

in a step E, the visited telecommunications network receives, from the user equipment, a message containing subscription concealed identifier information and/or routing indicator information, in a step F, the visited telecommunications network requests the domain and/or host name resolver entity or functionality to resolve the second domain and/or host name and includes the routing indicator information in the resolve request, in a step G, the domain and/or host name resolver entity or functionality returns an address related to the first secure edge protection proxy entity or functionality, in a step H, the visited telecommunications network forwards a message related to the message received in step E via the first secure edge protection proxy entity or functionality.

It is thereby advantageously possible to realize and implement a method according to the invention in a comparatively simple and efficient manner.

According to a further preferred embodiment of the present invention—especially according to a first variant of a third solution or embodiment—, in order for the third secure edge protection proxy entity or functionality accessing the first secure edge protection proxy entity or functionality in an authenticated manner, the third secure edge protection proxy entity or functionality accesses the first secure edge protection proxy entity or functionality based on a specific routing indicator information, wherein the specific routing indicator information is part of the request, related to the user equipment, received by the network function of the visited telecommunications network in the first step, and triggering a message towards the third secure edge protection proxy entity or functionality, wherein a routing-indicator-specific domain and/or host name information related to a secure edge protection proxy entity or functionality additionally comprises, as a part or field thereof, routing indicator information or information derived from the routing indicator, and wherein the first secure edge protection proxy entity or functionality is reachable using a routing-indicator-specific domain and/or host name information having as a part or field thereof the specific routing indicator information or information derived from the routing indicator, wherein the first secure edge protection proxy entity or functionality is reachable, by the third secure edge protection proxy entity or functionality, via a first routing-indicator-specific domain and/or host name, wherein the first routing-indicator-specific domain and/or host name is related to the second network identifier information, wherein in a step K, the visited telecommunications network receives, from the user equipment, a message containing subscription concealed identifier information and a routing indicator information corresponding to the specific routing indicator information, in a step L, the visited telecommunications network is configured to use the first routing-indicator-specific domain and/or host name in order to access the first secure edge protection proxy entity or functionality.

It is thereby advantageously possible to realize and implement a method according to the invention in a comparatively simple and efficient manner.

According to a further preferred embodiment of the present invention—especially according to a second variant of the third solution or embodiment—, in order for the third secure edge protection proxy entity or functionality accessing the first secure edge protection proxy entity or functionality in an authenticated manner, the third secure edge protection proxy entity or functionality receives or is able to access secure edge protection proxy information, especially comprising addressing and/or domain name information containing a list of routing indicators and/or routing indicator ranges and corresponding to related domain and/or host names, wherein the first secure edge protection proxy entity or functionality is reachable, by the third secure edge protection proxy entity or functionality, via a fourth domain and/or host name, wherein the fourth domain and/or host name is related to the second network identifier information and one or more routing indicators and/or routing indicator ranges, in a step M, the visited telecommunications network receives from the user equipment a message containing subscription concealed identifier information and a routing indicator, wherein the secure edge protection proxy information corresponds to the fourth domain and/or host name and one or more routing indicators and/or routing indicator ranges in a step N, the visited telecommunications network is configured to use the fourth domain and/or host name in order to access the first secure edge protection proxy entity or functionality.

It is thereby advantageously possible to realize and implement a method according to the invention in a comparatively simple and efficient manner.

Furthermore, it is advantageously possible and preferred according to the present invention that network identifier information comprises a mobile country code, mobile network code and/or network identifier.

According to a further preferred embodiment of the present invention, in a step O, the visited telecommunications network forwards towards the first telecommunications network a message containing subscription concealed identifier information and/or routing indicator in a step P, the first telecommunications network returns deconcealed subscriber permanent identifier information comprising the second network identifier information in a step Q, the third secure edge protection proxy entity or functionality maps the return deconcealed subscriber permanent identifier information to the first secure edge protection proxy entity or functionality, especially by storing a mapping between the deconcealed subscriber permanent identifier information and the first domain and/or host name, routing indicator, and/or its resolved address in a step R, the visited telecommunications network receives a message containing the previously mapped subscriber permanent identifier information comprising the second network identifier information in a step S, the third secure edge protection proxy entity or functionality sends the message via the first secure edge protection proxy entity or functionality as per the stored mapping.

It is thereby advantageously possible to realize and implement a method according to the invention in a comparatively simple and efficient manner.

Furthermore, the present invention relates to a system for providing communication services to a user equipment involving a first telecommunications network composed of network functions and a second telecommunications network composed of network functions, wherein the first telecommunications network uses or is assigned to a first network identifier information and is able to be accessed by or via a first secure edge protection proxy entity or functionality, and wherein the second telecommunications network uses or is assigned to a second network identifier information and is able to be accessed by or via a second secure edge protection proxy entity or functionality, wherein, in case that the user equipment uses or is connected to an access network of a visited telecommunications network, the visited telecommunications network composed of network functions likewise comprising a third secure edge protection proxy entity or functionality, the user equipment uses a user equipment subscription including subscriber permanent identifier information that is related to or assigned to the first network while the respective subscription identifier information comprises the second network identifier information, wherein either subscriber permanent identifier is included by the user equipment for identification and/or routing purposes in messages towards the visited telecommunications network, or subscription concealed identifier information containing information derived from the subscriber permanent identifier and/or a routing indicator information is included by the user equipment for identification and/or routing purposes in messages towards the visited telecommunications network, wherein messages between, on the one hand, the visited telecommunications network and, on the other hand, the first or the second telecommunications network or both of the first and the second telecommunications network are forwarded via a bidirectional channel between, on the one hand, the third secure edge protection proxy entity or functionality and, on the other hand, the first or second secure edge protection proxy entity or functionality or both of the first and second secure edge protection proxy entity or functionality, and vice-versa, wherein deconcealment of subscription concealed identifier information into a subscriber permanent identifier information is performed by the first telecommunications network, wherein, in order to provide the communication services to the user equipment comprising or applying secure edge protection proxy authentication, the system is configured such that:

a network function of the visited telecommunications network receives a request related to the user equipment, triggering a message towards the third secure edge protection proxy entity or functionality, the third secure edge protection proxy entity or functionality accesses the first secure edge protection proxy entity or functionality in an authenticated manner, especially such that a message related to the second network identifier information is able to be sent, by the visited telecommunications network, to a network function in the first telecommunications network and accepted by the first telecommunications network.

Additionally, the present invention relates to a program comprising a computer readable program code which, when executed on a computer and/or on a user equipment and/or on a network node of a first, second and/or third telecommunications network, especially a first, second and/or third secure edge protection proxy entity or functionality, or in part on the user equipment and/or in part on the network node of the first, second and/or third telecommunications network, especially the first, second and/or third secure edge protection proxy entity or functionality, causes the computer and/or the user equipment and/or the network node of the first, second and/or third telecommunications network to perform a method according to the invention.

Furthermore, the present invention relates to a computer-readable medium comprising instructions, which, when executed on a computer and/or on a user equipment and/or on a network node of a first, second and/or third telecommunications network, especially a first, second and/or third secure edge protection proxy entity or functionality, or in part on the user equipment and/or in part on the network node of the first, second and/or third telecommunications network, especially the first, second and/or third secure edge protection proxy entity or functionality, causes the computer and/or the user equipment and/or the network node of the first, second and/or third telecommunications network to perform a method according to the invention.

These and other characteristics, features and advantages of the present invention will become apparent from the following detailed description, taken in conjunction with the accompanying drawings, which illustrate, by way of example, principles of the invention. The description is given for the sake of example only, without limiting the scope of the invention. The reference figures quoted below refer to the attached drawings.

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a user equipment 20 is schematically shown being connected to a visited telecommunications network 300 comprising an access network 310 and a core network 320, and the visited telecommunications network 300 being connected to a first telecommunications network 100 and to a second telecommunications network 200. The telecommunications networks 100, 200, 300 are shown to communicate via respective secure edge protection proxy entities or functionalities, i.e. the first telecommunications network 100 comprises a first secure edge protection proxy entity or functionality 102, the second telecommunications network 200 comprises a second secure edge protection proxy entity or functionality 202, and the visited telecommunications network 300 comprises a third secure edge protection proxy entity or functionality 302. In the context of the present invention, the terms "visited telecommunications network 300" and "third telecommunications network 300" are used synonymously. The telecommunications networks 100, 200, 300 comprise the respective secure edge protection proxy entities or functionalities 102, 202, 302, respectively, besides other network functions 105, 205, 305, or, in other words, the telecommunications networks 100, 200, 300 are composed of network functions 105, 205, 305 (i.e. the first telecommunications network 100 comprises (first) network functions 105, the second telecommunications network 200 comprises (second) network functions 205, and the visited telecommunications network 300 comprises (third) network functions 305), and the secure edge protection proxy entities or functionalities 102, 202, 302, respectively, are part thereof. According to the present invention, the first telecommunications network 100 uses or is assigned to a first network identifier information 101, typically being a (first) public land mobile network identifier information, and is able to be accessed by or via the first secure edge protection proxy entity or functionality 102 (especially by the third or visited telecommunications network 300 or its third secure edge protection proxy entity or functionality 302). Likewise, the second telecommunications network 200 uses or is assigned to a second network identifier information 101, typically being a (second) public land mobile network identifier information, and is able to be accessed by or via the second secure edge protection proxy entity or functionality 202 (especially by the third or visited telecommunications network 300 or its third secure edge protection proxy entity or functionality 302).

As already said, the visited telecommunications network 300 comprises an access network 310 (or visited (or third) access network 310) and a core network 320 (or visited (or third) core network 320). Likewise, the first telecommunications network 100 comprises a (first) access network and a (first) core network 120, and the second telecommunications network 200 comprises a (second) access network and a (second) core network 220. Schematically, FIG. 1 shows the (third) access network 310 of the visited telecommunications network 300 comprising a plurality of radio cells 11, 12. In the exemplary situation or scenario shown in FIG. 1, a first base station entity 311 generates or is associated with or spans the first radio cell 11, and a second base station entity 312 generates or is associated with or spans the second radio cell 12. The user equipment 20. The user equipment 20 is typically, but not necessarily, mobile i.e. able to move with respect to the (typically, but not necessarily static) radio cells 11, 12 or corresponding base station entities 311, 312 of the considered access network 310. In the exemplarily represented illustration of FIG. 1, the (third) core network 320 (of the visited telecommunications network 300) is connected to the first telecommunications network 100, especially the first core network 120, and to the second telecommunications network 200, especially the second core network 220 via, its (third) secure edge protection proxy entity or functionality 302 and via the first and second secure edge protection proxy entity or functionality 102, 202, respectively. Additionally, FIG. 1 shows the second telecommunications network 200 comprising (especially as part of its network functions 205) a (second) network repository function 250.

According to the present invention, different solutions are provided for the following situation of a roaming situation of a user equipment involving telecommunications networks communicating in an authenticated manner among each other (especially involving 5G networks or 5G systems or, typically, higher generation networks), especially the telecommunications networks being accessed via a SEPP (secure edge protection proxy entity or functionality):

For a given PLMN ID (or network identifier information, especially the second network identifier information), a (first) group of subscribers (hereinafter also designated via user equipment 20') with subscriptions containing this PLMN ID shall be served from (or by) a core network (as it is ordinarily the use case for telecommunications networks, i.e. in the exemplary situation this core network shall be the second core network 220).

According to the present invention, however, another (second) group of subscribers (such as user equipment 20)—also with subscriptions containing this PLMN ID (or network identifier information, especially the second network identifier information) or, at least, using this PLMN ID (or network identifier information according to the second network identifier information 201—shall be served from (or by) another core network (i.e. by the core network of another telecommunications network, in the context of the present invention, especially the first core network 120, i.e. a core network associated to another, namely the first network identifier information 101).

The same is applicable for the cases where other network identifiers are used instead of a PLMN ID, e.g. for Stand-alone Non-Public Networks (SNPNs), whereby a combination of PLMN ID (sometimes a generic one such as 999 99) and Network Identifier (NID) is used instead of a PLMN ID. Furthermore, the same is also applicable when, e.g. in SNPNs when subscriber data is in NAI form (i.e. user@domain), a network domain identifies a network.

In case that the user equipment 20 is in a roaming situation, i.e. the visited telecommunications network 300 is present or involved, this means that the third secure edge protection proxy entity or functionality 302 needs to somehow access the correct network function within the first telecommunications network (especially within the first core network 120) while still using the second network identifier information 201 of the second telecommunications network 200 (whose network identifier information is used by the subscription of the user equipment 20).

Figure 3:
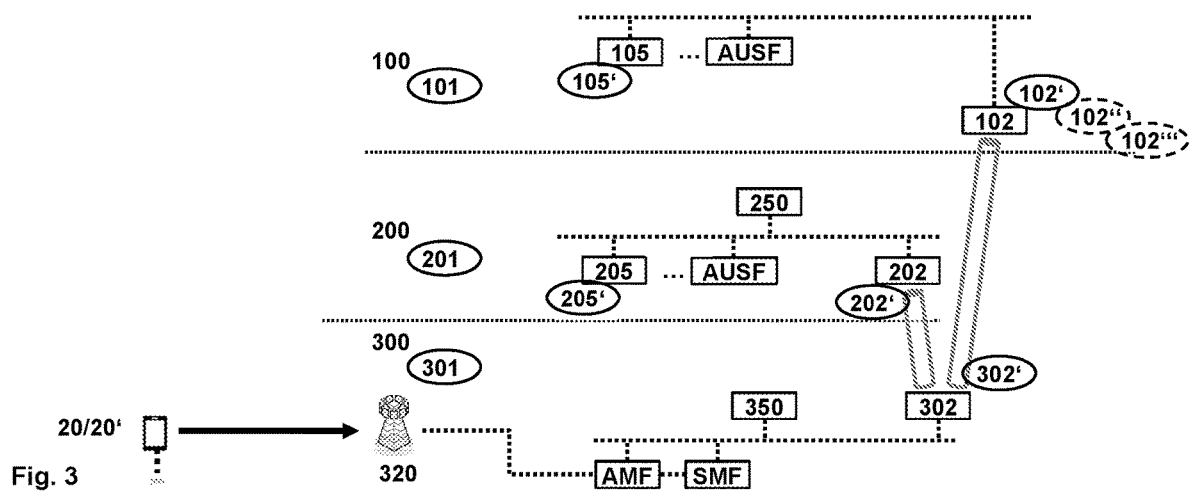
FIG. 3 schematically illustrates an overview regarding an implementation for providing communication services to a user equipment according to the present invention.

This case is schematically shown in FIG. 3, which represents the user equipment 20 accessing the third access network 320 of the visited telecommunications network 300 (i.e. the respective USIM comprises the subscriber permanent identifier information, the mobile country code (MCC), e.g. "241", the mobile network code (MNC), e.g. "03", the IMSI, and a routing indicator information, e.g. "RI=99"), and the respective secure edge protection proxy entities or functionalities 302, 202, 102 are communicating with each other. In case the user equipment uses the second network identifier information 201 (e.g. public land mobile network identifier information "241 03" for country two, i.e. for the second telecommunications network 200), the third network repository function 350 exemplarily requests to discover the respective authorization functionality (AUSF) via forwarding (via the third and the second secure edge protection proxy entity or functionality 302, 202) this request ("Discover AUSF for '241 03'; forwarded to nrf.5gc.mnc03.mcc241.3gppnetwork.org via V-SEPP") to the second network repository function 250 of the second telecommunications network 200 (i.e. assigned to the used network identifier information "241 03").

In case the user equipment is a user equipment 20' (having the second telecommunications network 200 as its home network, i.e. especially having another routing indicator information (instead of "99")), the second network repository function 250 provides as an answer (or forwards the request to) the respective authorization functionality (AUSF) of the second telecommunications network 200, i.e. the respective authorization functionality responsible for an IMSI range in 241 03, and SIMs assigned to Ms (routing indicators), e.g., 01 to 98. In case the user equipment is a user equipment 20 (having the first telecommunications network 100 as its home network (or at least being served by the first core network 120)—but nevertheless using the network identifier information of the second telecommunications network 200), the answer is to be provided by (or the requests needs to be forwarded to) the respective authorization functionality (AUSF) of the first telecommunications network 100, i.e. the respective authorization functionality responsible for an IMSI range in 241 03, and SIMS assigned to RI (routing indicator), e.g., 99.

Figure 2:
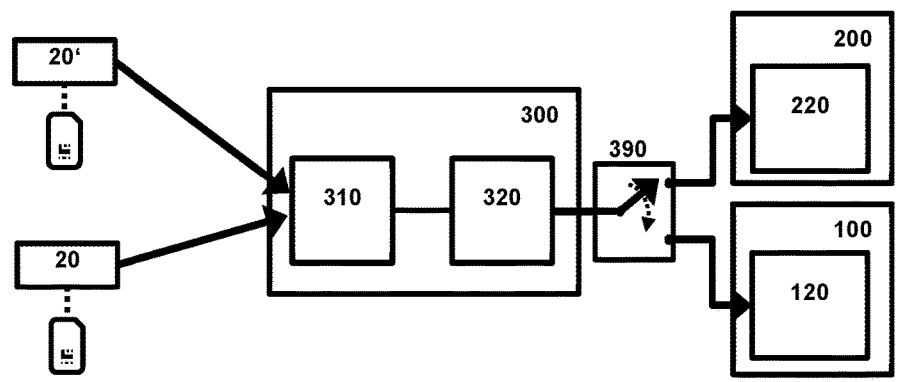
FIG. 2 schematically illustrates a conventional implementation for providing communication services to a user equipment.

This is in contrast to an implementation possible in conventionally known telecommunications networks (e.g. 4G networks), shown in FIG. 2, where a communication among telecommunications networks is not necessarily and/or mandatorily conducted in an authenticated manner and/or via a SEPP (secure edge protection proxy entity or functionality):

In such conventionally known telecommunications networks, it is possible, e.g., to simply reserve different IMSI ranges for the different groups of user equipments (i.e. the (first) group of subscribers 20' and the (second) group of subscribers 20) such that either the visited telecommunications network 300 or an IP exchange (IPX) 390 between the third telecommunications network 300 and the first and second telecommunications networks 100, 200 is configured such that messages regarding a certain IMSI range (of the second group of user equipments 20) are routed to the first telecommunications network 100 (e.g. a network having or using network identifier information "267 01" in country one), while messages regarding a (normal) IMSI range (of the first group of user equipments 20', or "normal SIMS of country two") are routed in a normal manner, i.e. to the second telecommunications network 200, e.g. in country two.

Hence, in conventionally known telecommunications networks, the issue is resolved in a transparent way (i.e. V-PLMNs 300 need not be aware of it) by having an IP Exchange (IPX) 390 re-route signaling messages based on the IMSI (or based on different IMSI ranges) within the (control plane) message(s). In such a scenario, the visited telecommunications networks (or V-PLMNs) use standardized fully qualified domain names (FQDNs), fully qualified domain names (GSMA, 3GPP), wherein in this case, target FQDNs for an EPC (enhanced packet core network, or 4G core network) are all within the well-known home network domain (HND) or home network realm of the second telecommunications network 200, i.e. for example "epc.mnc03.mcc241.3gppnetwork.org". Similar syntax is used for other network components, and IPX providers 390 can, based on the DNS queries used to resolve said FQDNs, source/destination IP addresses of the exchanged signaling packets and the content of the packets, evaluate whether a given signaling packet belongs to a given IMSI range. In this way, packets nominally belonging to the second telecommunications network 200 (having as public land mobile network identifier information "241 03") but actually belonging to user equipments 20 being served by the first telecommunications network 100 are able to be re-routed towards targets in the first telecommunications network 100 (having public land mobile network identifier information "267 01") without requiring specific configuration(s) in roaming partner's (V-PLMNs') networks, i.e. the IPX providers 390 provide network operators with inter-operator connectivity and are able to transparently re-route messages towards network "267 01" based on the determination of corresponding IMSI ranges, despite such messages comprising reference to network "241 03".

According to the present invention and as already said, different solutions are provided for the situation of the user equipment 20 roaming in the visited telecommunications network 300 and using the network identifier information 201 (especially the PLMN ID) of the second telecommunications network 200 but being served by the first telecommunications network 100 (or its core network 120): In this situation, the involved telecommunications networks exchange messages, especially control plane messages, in order to provide the requested communication services to the user equipment 20 but this message exchange is performed in an authenticated manner, using a secure edge protection proxy entity or functionality 102, 202, 302 as part of the involved telecommunications networks 100, 200, 300. Especially, this means that a message related to the second network identifier information 201 is able to be sent, by the visited telecommunications network 300, to a network function 105 in the first telecommunications network 100 and accepted by the first telecommunications network 100.

Three main such solutions are provided according to the present invention, each comprising a number of variants:

According to the first solution provided according to the present invention, the (second) network repository function 250 returns (to a request received from the visited telecommunications network 300) network function profiles containing FQDNs pointing to the first telecommunications network, i.e. PLMN-level NRF 250 for country two's operator is returning network function profiles containing FQDNs pointing to country one's operator PLMN.

According to the second solution provided according to the present invention, the routing indicator is added as a parameter to the DNS request resolving the FQDN of the respective secure edge protection proxy entity or functionality (and, hence, which telecommunications network) to be addressed.

According to the third solution provided according to the present invention, the routing indicator is added as part of the well-known FQDN of the secure edge protection proxy entity or functionality or mapping information is provided between one or more routing indicators and/or routing indicator ranges and a FQDN.

According to all solutions of the present invention and/or variants thereof, it is advantageously possible to realize an implementation such that both
- a user equipment, while using a network identifier information of one telecommunications network, is able to be served by another telecommunications network, especially in case of M2M communication,
- and additionally such an implementation is in accordance with 5G mechanisms, especially maintaining 5G security, i.e. an exchange of (control plane) messages in an authenticated manner between the telecommunications networks (despite using a 'wrong' network identifier information).

In conventionally known telecommunications networks, especially according to the 5G standard, it is known to use a roaming architecture involving secure edge protection proxy entities or functionalities.

These secure edge protection proxy entities or functionalities serve for communication purposes—especially implementing or realizing the so-called N32 reference point (or interface) on the control plane, especially according to 3GPP TS 23.501, clause 4.2.4—between a visited public land mobile network (or visited network) and a home public land mobile network (or home network) of the user equipment considered (a further reference point or interface between such two telecommunications networks being the so-called N9 reference point or interface for the user plane or for user plane data or traffic).

Typically, each of the telecommunications networks comprises a plurality of network functions associated to the control plane network functions, providing APIs (application programming interfaces) associated to each network function. The purpose of the secure edge protection proxy entities or functionalities is detailed in 3GPP TS 23.501, clause 6.2.17; the secure edge protection proxy (SEPP) entity or functionality is a non-transparent proxy and supports the functionalities of message filtering and policing on inter-PLMN control plane interfaces, as well as topology hiding, and especially both for service producer (network functions) and for service consumer (network functions), the result of the service relaying is equivalent to a direct service interaction; the secure edge protection proxy entities or functionalities communicate either directly (e.g. via TLS, transport layer security) or via one or more IPX providers 390; it is not possible for an IPX 390 to divert messages towards a different secure edge protection proxy (such as a home-secure edge protection proxy) than the one initially intended as 5G has built-in functionality to prevent man-in-the-middle attacks; as such, a visited secure edge protection proxy entity or functionality (e.g. 302) is ensured to be communicating with the intended (i.e. "correct") home secure edge protection proxy entity or functionality (e.g. 102).

Furthermore in conventionally known telecommunications networks, especially according to the 5G standard, subscriber data may be encrypted and/or concealed, especially in order to reduce the applicability of IMSI-catchers.

According to the 5G standard, besides a subscriber permanent identifier information (Subscriber Permanent Identifier, SUPI), a subscription concealed identifier information (Subscription Concealed Identifier, SUCI) is used. The subscription concealed identifier information can only be de-concealed by the home network (or home public land mobile network) and the network functions responsible are the authorization functionality (AUSF) and the unified data management (UDM).

The subscription concealed identifier, typically contains the network identifier information (or PLMN ID) of the subscription owner, the routing indicator (RI) information (especially for cases, e.g. in large networks, where more than one AUSFs exists), the concealed subscriber permanent identifier information (typically the IMSI in case the subscriber permanent identifier information is an and the Home Network Public Key Identifier (an identifier used to indicate which public/private key pair is used for subscriber permanent identifier protection and de-concealment of the subscription concealed identifier).

In conventionally known telecommunications networks (especially in accordance to 3GPP TS 23.502, clause 4.2.2.2.2), prior to the authentication/security step (involving the decryption or de-concealment of the subscription concealed identifier information) inter-network signaling only comprises the public land mobile network identifier information and the routing indicator information; after this step (and also for further procedures), the public land mobile network identifier information as well as the mobile subscription identification number, MSIN, is available.

Furthermore, service-based architecture (3GPP TS 23.501) and network function discovery (3GPP TS 23.502) are established concepts in conventionally known telecommunications networks.

Furthermore, in conventionally known telecommunications networks, it is possible that several network repository functions can be deployed via a hierarchical structure (3GPP TS 23.501). In such a hierarchical structure, NRFs are placed based on a PLMN and slice hierarchy, e.g. a PLMN-level NRF is responsible for NF profiles within the whole PLMN. Communication between PLMNs (e.g. in the case of roaming) can be managed by PLMN-level NRFs. As per 3GPP TS 23.501 and GSMA IR.67, the PLMN level NRF for a given PLMN is reachable via the well-known FQDN "nrf.5gc.mnc<MNC>.mcc<MCC>.3gppnetwork.org".

An AMF in a V-PLMN queries its NRF (the V-NRF) for AUSFs for the given H-PLMN ID and includes available information such as:

SUCI: includes PLMN ID, ROUTING INDICATOR
Access Technology (5G NR, Wifi, etc.)
The V-NRF contacts the H-NETWORK REPOSITORY FUNCTION via its well-known FQDN,
which is reached by a matching SEPP based on the H-NRF's HND, that is 5gc.mnc<MNC>.mcc<MCC>.3gppnetwork.org.

According to the present invention, a method for providing communication services to a user equipment 20 is provided, wherein in case that the user equipment 20 uses or is connected to the access network 310 of the visited telecommunications network 300, the user equipment 20 uses a user equipment subscription including subscriber permanent identifier information that is related to or assigned to the first network 100 while the respective subscription identifier information comprises the second network identifier information 201. Typically, either subscriber permanent identifier information is included by the user equipment 20 for identification and/or routing purposes in messages towards the visited telecommunications network 300, or subscription concealed identifier information containing information derived from the subscriber permanent identifier and/or a routing indicator information is included by the user equipment 20 for identification and/or routing purposes in messages towards the visited telecommunications network 300.

In such a situation according to the present invention, messages between, on the one hand, the visited telecommunications network 300 and, on the other hand, the first or the second telecommunications network 100, 200 or both of the first and the second telecommunications network 100, 200 are forwarded via a bidirectional channel between, on the one hand, the third secure edge protection proxy entity or functionality 302 and, on the other hand, the first or second secure edge protection proxy entity or functionality 102, 202 or both of the first and second secure edge protection proxy entity or functionality 102, 202, and vice-versa. Additionally, deconcealment of subscription concealed identifier information into a subscriber permanent identifier information is performed by the first telecommunications network 100 (or its core network 120).

According to the present invention, in order to provide the communication services to the user equipment 20 comprising or applying secure edge protection proxy authentication, the method comprises the following steps:
in a first step, a network function of the visited telecommunications network 300 receives a request related to the user equipment 20 (typically due to the user equipment 20 requesting a communication service, e.g. in order to be connected to the visited telecommunications network 300), triggering a message towards the third secure edge protection proxy entity or functionality 302,
in a second step, the third secure edge protection proxy entity or functionality 302 accesses the first secure edge protection proxy entity or functionality 102 in an authenticated manner, especially such that a message related to the second network identifier information 201 is able to be sent, by the visited telecommunications network 300, to a network function 105 in the first telecommunications network 100 and accepted by the first telecommunications network 100.

It is thereby advantageously possible to realize an implementation such that not only it is possible that a user equipment, while using a network identifier information of one telecommunications network, is able to be served by another telecommunications network, especially in case of M2M communication, is able to communicate but also that such an implementation is in accordance with 5G mechanisms, especially maintaining 5G security, i.e. an exchange of (control plane) messages in an authenticated manner between the telecommunications networks (despite the user equipment 20 using network identifier information related to the second telecommunications network 200 while being served by the first telecommunications network 100).

As explained in relation to FIG. 3, according to the present invention, different solutions are provided for the situation of a roaming user equipment (roaming in the third telecommunications network 300), and using the second network identifier information (or public land mobile network identifier information) of the second telecommunications network 200 is nevertheless served by the (or from) the first telecommunications network 100 or its core network 120. This requires the involved telecommunications networks 100, 200, 300 to communicate with each other, and, according to the different solutions and variants of the present invention, this is possible in accordance with the security and authentication mechanisms introduced with the implementation of telecommunications networks according to the 5G standard, i.e. it is possible that the telecommunications networks communicate among each other in an authenticated manner (especially involving 5G networks or 5G systems or, typically, higher generation networks), especially the telecommunications networks being accessed via a SEPP (secure edge protection proxy entity or functionality): In the roaming situation, the visited telecommunications network 300 (via its third secure edge protection proxy entity or functionality 302) needs to access the correct network function within the first telecommunications network 100 (especially within the first core network 120) while still using the second network identifier information 201 of the second telecommunications network 200 (whose network identifier information is used by (or as part of) the subscription of the user equipment 20).

According to the present invention, it is especially preferred that in or during the first step, the request related to the user equipment 20 is especially triggered by the user equipment 20 accessing the visited telecommunications network 300 to connect or to be connected thereto.

Furthermore, it is provided according to the present invention to be able to use a predefined (or well-known) FQDN in order to be able to access the secure edge protection proxy entity or functionality of a specific telecommunications network.

In conventionally known telecommunications network, it is only defined and expected that in a given telecommunications network, especially for a given network identifier information or PLMN identifier information, one secure edge protection proxy entity or functionality (or secure edge protection proxy instance) exists.

According to the present invention, it is provided to be able to use a predefined (or well-known) FQDN in order to access a respective secure edge protection proxy entity or functionality of a telecommunications network; for example, the well-known FQDN "sepp.5gc.mnc<MNC>.mcc <MCC>.3gppnetwork.org" might be used for allowing the visited telecommunications network 300 to construct a FQDN addressing the respective secure edge protection proxy entity or functionality of the identified telecommunications network. In this respect, it is important that the FQDN via which a secure edge protection proxy entity or functionality is reachable is the FQDN used in the certificates that are used for mutual authentication between secure edge protection proxy entities or functionalities.

Thus, even if two IP addresses resolve to the same FQDN (e.g., for load balancing purposes), a valid certificate matching the FQDN must be provided, otherwise the third secure edge protection proxy entity or functionality 302 (V-SEPP or visited SEPP) might deem the first secure edge protection proxy entity or functionality 102 (H-SEPP or home-SEPP) as an impersonator and authentication fails.

Hence, using the predefined FQDN, it is advantageously possible, according to the present invention, that communication towards a given PLMN ID (or towards a given telecommunications network) is done via its matching secure edge protection proxy entity or functionality, and, hence, for any given secure edge protection proxy entity or functionality, it is ensured that the SEPP counterpart is authenticated.

Hence, according to the present invention, it is preferred that the first secure edge protection proxy entity or functionality 102 is reachable by the third secure edge protection proxy entity or functionality 302 via a first domain and/or host name 102' (especially a FQDN such as "sepp.5gc.mnc<MNC_of_100>.mcc<MCC_of_100>.3gppnetwork.org") related to the first network identifier information 101; this is schematically hinted at via reference sign 102' in FIG. 3;
  wherein the second secure edge protection proxy entity or functionality 202 is reachable, by the third secure edge protection proxy entity or functionality 302, via a second domain and/or host name 202' (especially a FQDN such as "sepp.5gc.mnc<MNC_of_200>.mcc<MCC_of_200>.3gppnetwork.org") related to the second network identifier information 201;
  wherein a specific network function 105 in the first telecommunications network 100 is reachable, by a consumer network function 305 in the visited telecommunications network 300, via a further first domain and/or host name 105' related to the specific network function 105 and the first network identifier information 101;
  wherein a further specific network function 205 in the second telecommunications network 200 is reachable, by a consumer network function 305 in the visited telecommunications network 300, via a domain and/or host name 205' related to the further specific network function 205 and the second network identifier information 201,
  wherein especially in order to provide the communication services to the user equipment 20 using service-based interfaces and/or a network repository function, a network function service is requested and/or provided, by the specific network function 105 of the first telecommunications network 100, to the consumer network function 305 of the visited telecommunications network 300.

Figure 4:
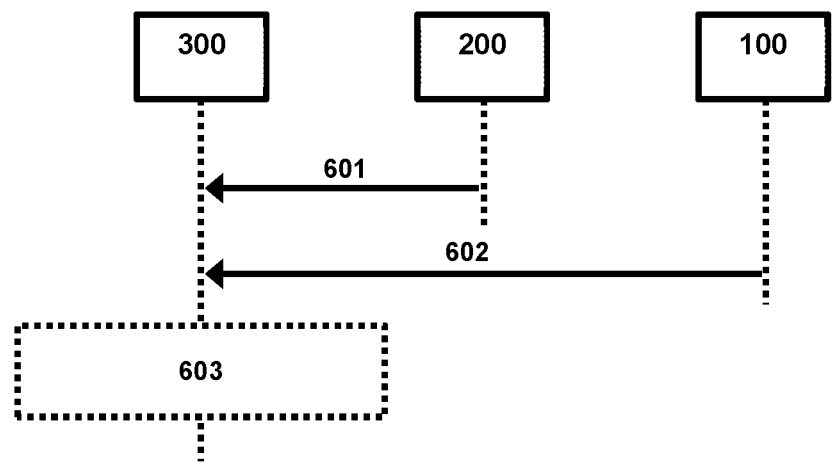
FIGS. 4, 5 and 6 schematically illustrate a first solution according to the present invention for providing communication services to a user equipment in an exemplary situation (i.e. involving first and second telecommunications networks using or being assigned to, respectively, a first and second network identifier information, wherein, in case that the user equipment uses or is connected to an access network of a visited telecommunications network, the user equipment uses a user equipment subscription, especially including subscriber permanent identifier information, that is related or assigned to the first network while the respective subscription identifier information comprises the second network identifier information) such that despite the telecommunications networks communicating via secure edge protection proxy entities or functionalities, an authenticated communication is possible.
Figure 5:
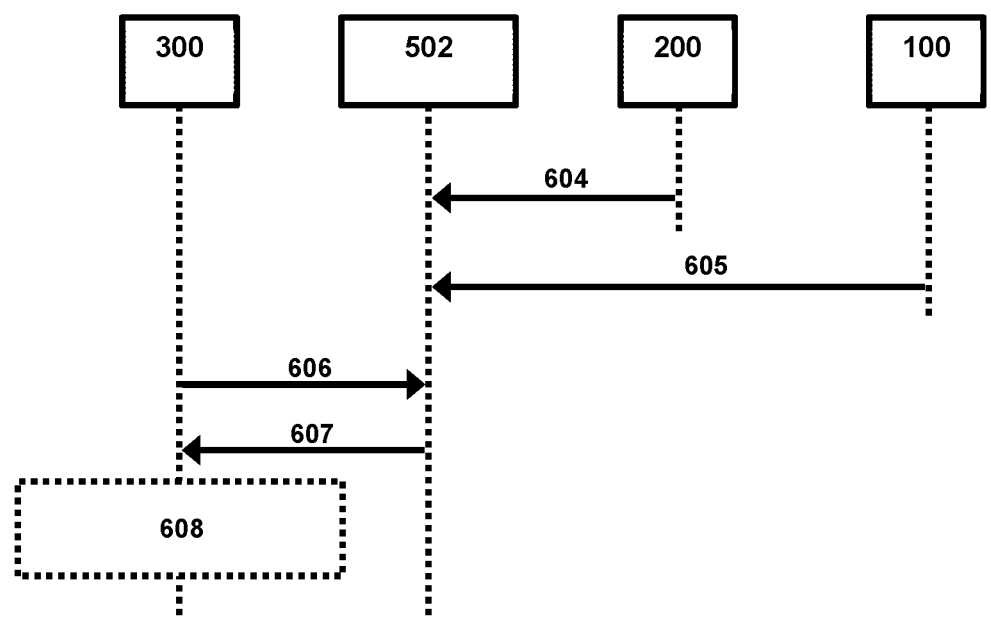
Figure 6:
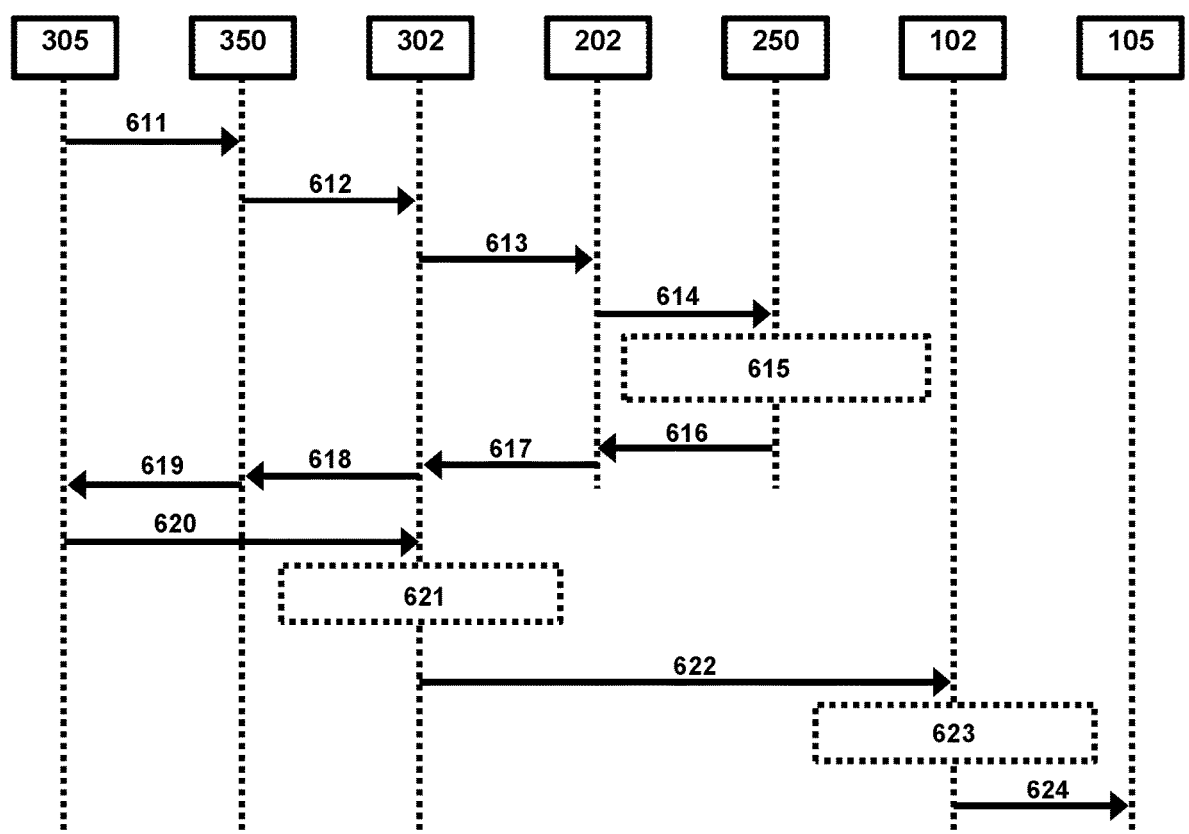

In FIGS. 4, 5 and 6 a first solution according to the present invention is schematically shown for providing communication services to a user equipment in the situation as described—i.e. involving first and second telecommunications networks 100, 200 using or being assigned to, respectively, a first and second network identifier information 101, 201, wherein, in case that the user equipment 20 uses or is connected to an access network 320 of a visited telecommunications network 300, the user equipment 20 uses a user equipment subscription, especially including subscriber permanent identifier information, that is related or assigned to the first telecommunications network 100 while the respective subscription identifier information comprises the second network identifier information—such that despite the telecommunications networks communicating via secure edge protection proxy entities or functionalities, an authenticated communication is possible.

According to the first solution or embodiment according to the present invention—in order for the third secure edge protection proxy entity or functionality 302 accessing the first secure edge protection proxy entity or functionality 102 in an authenticated manner—, prior to the first secure edge protection proxy entity or functionality 102 being accessed by the third secure edge protection proxy entity or functionality 302, the third secure edge protection proxy entity or functionality 302 accesses the second secure edge protection proxy entity or functionality 202 related to the user equipment 20, especially via transmitting a network function discovery query message to the second secure edge protection proxy entity or functionality 202,
  wherein the second secure edge protection proxy entity or functionality 202 transmits an indication that the first secure edge protection proxy entity or functionality 102 is to be accessed regarding the requested network function, wherein especially the second telecommunications network 200 comprises a network repository function 250 related to the second network identifier information 201, and the method comprises the following steps:
    in a step A, the visited telecommunications network 300 receives, from the user equipment 20, a message containing subscription concealed identifier information and/or routing indicator information,
    in a step B, the visited telecommunications network 300 queries the network repository function 250 for a network function capable of deconcealing the received concealed identifier information and/or routing indicator information,
    in a step C, the network repository function 250 returns information related to the specific network function 105 and including the further first domain and/or host name 105' related to the first network identifier information 101,
    in a step D, the visited telecommunications network 300 is configured to forward, based on the first network identifier information 101 contained within the further first domain and/or host name 105', a message containing the subscription concealed identifier information and/or the routing indicator information to the specific network function 105, especially while this message contains a subscription concealed identifier information and/or a routing indicator information related to the second network identifier information 201 and especially thereby realizing the second step.

This is exemplarily shown in FIG. 6 which shows an embodiment of the network repository function of the second telecommunications network 200 returning network function profiles containing FQDNs pointing to the first telecommunications network 100, illustrated via a communication diagram between a consuming network function (e.g. an (or the) access and mobility management function as an example of such a network function 305) of the visited telecommunications network 300, the network repository function 350 of the visited telecommunications network 300, the third secure edge protection proxy entity or functionality 302, the second secure edge protection proxy entity or functionality 202, the network repository function 250 of the second telecommunications network 200, the first secure edge protection proxy entity or functionality 102, and the serving network function 105 of the first telecommunications network 100.

In a first processing step 611, the access and mobility management function (or network function) 305 transmits a network function discovery query regarding a network function "X" (e.g. a unified data management network function, or also called the specific network function 105), especially comprising control parameters; this processing step is typically triggered by step A mentioned above. In a second processing step 612, the network repository function 350 of the visited telecommunications network 300 directs the network function discovery query to the third secure edge protection proxy entity or functionality 302, indicating the network repository function 250 of the second telecommunications network 200 as destination, e.g. via an FQDN "nrf.5gc.mnc03.mcc241.3gppnetwork.org". In a third processing step 613, the secure edge protection proxy entity or functionality 302 of the visited telecommunications network 300 forwards the network function discovery query to the secure edge protection proxy entity or functionality 202 of the second telecommunications network 200, especially using the well-known FQDN "sepp.5gc.mnc03.mcc241.3gppnetwork.org". In a fourth processing step 614, the secure edge protection proxy entity or functionality 202 of the second telecommunications network 200 forwards the network function discovery query to the network repository function 250 of the second telecommunications network 200, i.e. to the public land mobile network-level network repository function (of the second telecommunications network 200). The second, third and fourth processing steps 612, 613, 614 correspond to step B mentioned above. In a fifth processing step 615, the network repository function 250 of the second telecommunications network 200 comprises or contains information that the queried (or requested) network function (i.e. network function "X") is placed (or located) in another telecommunications network, namely the first telecommunications network 100 (e.g. having as public land mobile network identifier information "267 01"). In a sixth, seventh, eighth and ninth processing step 616, 617, 618, 619, the (requested) network function profile information, especially including the home network realm or domain or the corresponding information for network "267 01" (i.e. for the first telecommunications network 100, e.g. "nf-x.5gc.mnc01.mcc267.3gppnetwork.org" as the further first domain and/or host name 105' related to the first network identifier information 101 "267 01") is transmitted, by the network repository function 250 of the second telecommunications network 200, back to the requesting access and mobility management function (or network function) 305 (via the secure edge protection proxy entity or functionality 202 of the second telecommunications network 200, the secure edge protection proxy entity or functionality of the visited telecommunications network 300, the network repository function 350 of the visited telecommunications network 300). The sixth, seventh, eighth and ninth processing steps 616, 617, 618, 619 correspond to step C mentioned above.

In a tenth processing step 620, the access and mobility management function (or network function) 305 generates and transmits a request (especially comprising an FQDN information and/or parameters) towards the received information regarding the discovery query (of processing steps 611 to 619), i.e. for example to "nf-x.5gc.mnc01.mcc267.3gppnetwork.org", via the secure edge protection proxy entity or functionality 302 of the visited telecommunications network 300 as it targets another network (identifier information), especially another public land mobile network, namely the (network identifier information of the) first telecommunications network 100. In an eleventh processing step 621, the secure edge protection proxy entity or functionality 302 of the visited telecommunications network 300 evaluates if the requested redirection from the second telecommunications network 200 ("241 03") towards the first telecommunications network 100 ("267 01") is allowed. In a twelfth processing step 622, the secure edge protection proxy entity or functionality 302 of the visited telecommunications network 300 directs the request towards the secure edge protection proxy 102 of the first telecommunications network 100 ("267 01") as per the FQDN's home network realm or domain (i.e. not as per the subscriber permanent identifier's or subscription concealed identifier's public land mobile identifier information or network identifier information). In a thirteenth processing step 623, the secure edge protection proxy entity or functionality 102 of the first telecommunications network 100 evaluates if the requested redirection from the second telecommunications network 200 ("241 03") towards the first telecommunications network 100 ("267 01") is allowed. In a fourteenth processing step 624 the request is forwarded to the targeted serving network function 105 of the first telecommunications network 100.

Especially in order for the evaluations in the eleventh processing step 621 and in the thirteenth processing step 623 being conducted or processed correctly and securely, it is preferred according the present invention that the third secure edge protection proxy entity or functionality 302 accessing the first secure edge protection proxy entity or functionality 102 in an authenticated manner, especially step D, requires the third secure edge protection proxy entity or functionality 302 to have received or to be able to access secure edge protection proxy information, especially comprising an allow redirection-to-indication containing network identifier information and/or domain and/or host name information, and/or an allow-redirection-from-indication containing network identifier information and/or domain and/or host name information regarding the first and/or second secure edge protection proxy entity or functionality 102, 202 and/or regarding the first and/or second telecommunications network 100, 200, wherein especially the secure edge protection proxy information is accessed from a secure edge protection proxy metadata repository 502, wherein especially only if the allow-redirection-to-indication from the second secure edge protection proxy entity or functionality 202 includes the first network identifier information 101, and/or domain and/or host name information related to the first network, or only if the allow-redirection-from-indication from the first secure edge protection proxy entity or functionality 102 includes the second network identifier information 201 and/or domain and/or host name information related to the second network, or only if both the allow-redirection-to-indication from the second secure edge protection proxy entity or functionality 202 includes the first network identifier information 101 and/or domain and/or host name information related to the first network and the allow-redirectionfrom-indication from the first secure edge protection proxy entity or functionality 102 includes the second network identifier information 201, and/or domain and/or host name information related to the second network.

This is exemplarily shown in FIG. 4 illustrating an embodiment of the visited telecommunications network 300 (or, rather, the secure edge protection proxy entity or functionality 302) being provided with secure edge protection proxy information directly from the first telecommunications network 100 and/or the second telecommunications network 200—illustrated via a communication diagram between the visited telecommunications network 300, the second telecommunications network 200, and the first telecommunications network 100.

In a first processing step 601, the second telecommunications network 200 (especially the second secure edge protection proxy entity or functionality 202) transmits, to the visited telecommunications network 300 (especially to the third secure edge protection proxy entity or functionality 302) an information or a message comprising secure edge protection proxy information indicating "allow redirect to", i.e. the allow-redirection-to-indication (from the second secure edge protection proxy entity or functionality 202) includes the first network identifier information 101. In a second processing step 602, the first telecommunications network 100 (especially the first secure edge protection proxy entity or functionality 102) transmits, to the visited telecommunications network 300 (especially to the third secure edge protection proxy entity or functionality 302) an information or a message comprising secure edge protection proxy information indicating "allow redirect from", i.e. the allow-redirection-from-indication (from the first secure edge protection proxy entity or functionality 102) includes the second network identifier information 201. In a third processing step 603, the visited telecommunications network 300, especially the third secure edge protection proxy entity or functionality 302, comprises the secure edge protection proxy information for network (or public land mobile networks) "241 03" and "267 01" (i.e. the second and first telecommunications network 200, 100).

As an alternative embodiment, FIG. 5 shows an embodiment of the visited telecommunications network 300 (or, rather, the secure edge protection proxy entity or functionality 302) being able to access secure edge protection proxy information indirectly from the first telecommunications network 100 and/or the second telecommunications network 200—illustrated via a communication diagram between the visited telecommunications network 300, a secure edge protection proxy metadata repository 502, the second telecommunications network 200, and the first telecommunications network 100. In a first processing step 604, the second telecommunications network 200 (especially the second secure edge protection proxy entity or functionality 202) transmits, to the secure edge protection proxy metadata repository 502 an information or a message comprising secure edge protection proxy information indicating "allow redirect to", i.e. the allow-redirection-to-indication (from the second secure edge protection proxy entity or functionality 202) includes the first network identifier information 101. In a second processing step 605, the first telecommunications network 100 (especially the first secure edge protection proxy entity or functionality 102) transmits, to the secure edge protection proxy metadata repository an information or a message comprising secure edge protection proxy information indicating "allow redirect from", i.e. the allow-redirection-from-indication (from the first secure edge protection proxy entity or functionality 102) includes the second network identifier information 201. In a third processing step 606, the visited telecommunications network 300, especially the third secure edge protection proxy entity or functionality 302, queries the secure edge protection proxy information from the secure edge protection proxy metadata repository 502, and in a fourth processing step 607, the secure edge protection proxy metadata repository 502 transmits the secure edge protection proxy information including the "allow redirect to" and "allow redirect from" indications to the requesting third secure edge protection proxy entity or functionality 302 (or the visited telecommunications network 300). In a fifth processing step 608 the visited telecommunications network 300, especially the third secure edge protection proxy entity or functionality 302, comprises the secure edge protection proxy information for network (or public land mobile networks) "241 03" and "267 01" (i.e. the second and first telecommunications network 200, 100).

Hence, according to the first solution according to the present invention, the public land mobile network-level network repository function 250 of the second telecommunications network 200 ("country two's network repository function 250") returns network function profiles containing FQDNs pointing to the first telecommunications network 100 ("German public land mobile network"), and the visited telecommunications network 300 obtains secure edge protection proxy information (either directly—especially as part of the roaming agreement with the mobile network operator of the first and/or second telecommunications networks 100, 200—or via the secure edge protection proxy metadata repository 502, especially accessed via a well-known FQDN and especially managed by a central entity. Regardless of which option, or variant, is used, information related to relevant secure edge protection proxy entities or functionalities (e.g. of the first and second telecommunications network 100, 200) is available at the visited telecommunications network 300. The secure edge protection proxy information especially comprises the following two secure edge protection proxy parameters:

"Allow redirect to"-indication: This relates to the indication that messages from the given PLMN are able to contain targets (e.g., URLs located in any of the PLMNs in the list); this solves the issue of the third secure edge protection proxy 302 (V-SEPP) blocking outgoing messages where the target home network realm or domain in the FQDN does not match the information contained in the subscriber permanent identifier or subscription concealed identifier, e.g., HND mnc01.mcc267.3gppnetwork.org and SUPI/SUCI containing PLMN ID 263 03.

"Allow redirect from"-indication: Analogous to the prior parameter but indicating that the target H-SEPP (i.e. the first secure edge protection proxy entity or functionality 102) allows incoming messages from the given PLMNs, i.e. "indication that this PLMN can also process messages from said PLMNs".

Figure 7:
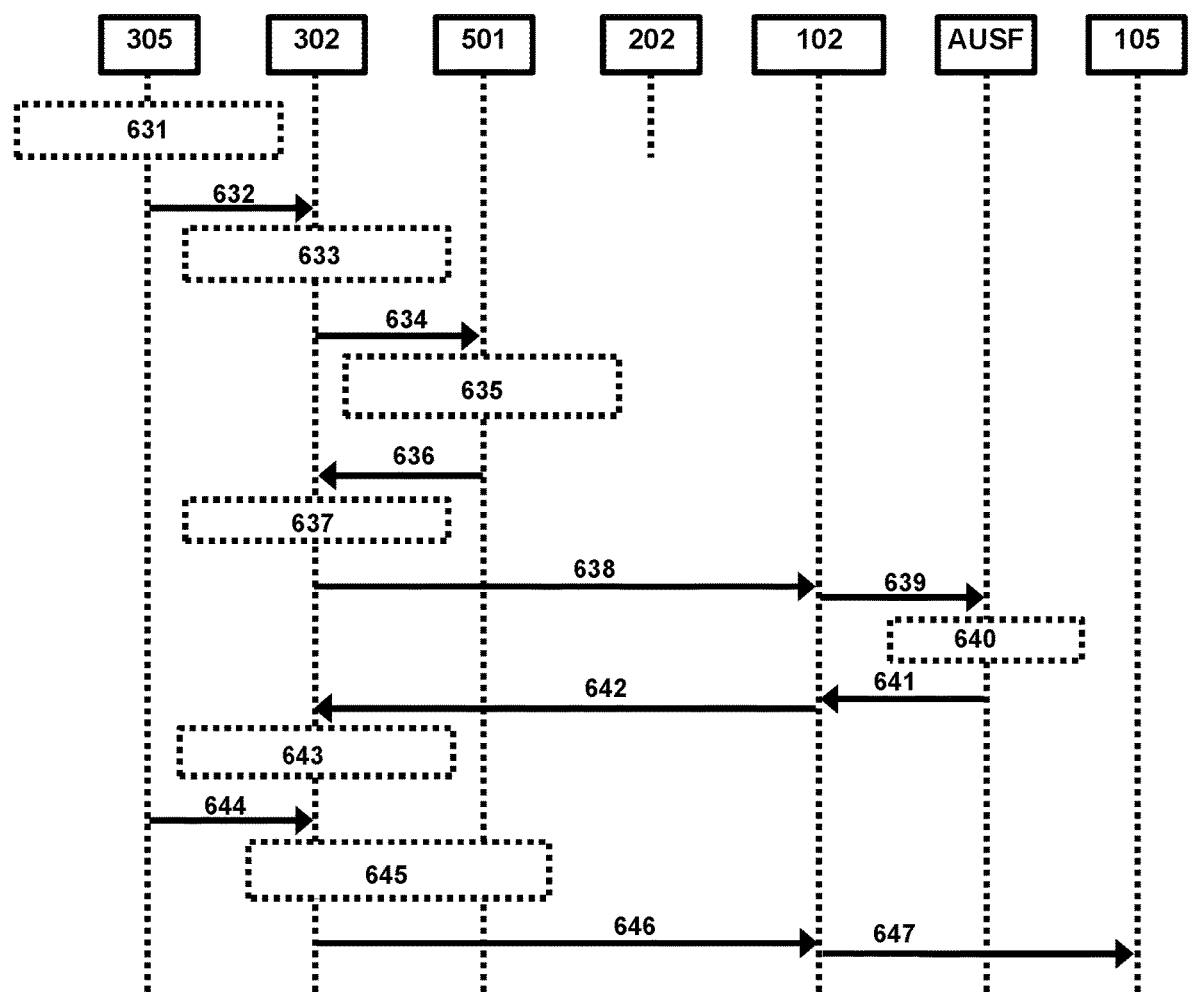
FIG. 7 schematically illustrates a second solution according to the present invention for providing communication services to a user equipment in an exemplary situation such that despite the telecommunications networks communicating via secure edge protection proxy entities or functionalities, an authenticated communication is possible.

In FIG. 7, a second solution according to the present invention is schematically shown for providing communication services to a user equipment in the situation as described—i.e. involving first and second telecommunications networks 100, 200 using or being assigned to, respectively, a first and second network identifier information 101, 201, wherein, in case that the user equipment 20 uses or is connected to an access network 320 of a visited telecommunications network 300, the user equipment 20 uses a user equipment subscription, especially including subscriber permanent identifier information, that is related or assigned to the first telecommunications network 100 while the respective subscription identifier information comprises the second network identifier information—such that despite the telecommunications networks communicating via secure edge protection proxy entities or functionalities, an authenticated communication is possible.

According to the second solution or embodiment according to the present invention, in order for the third secure edge protection proxy entity or functionality 302 accessing the first secure edge protection proxy entity or functionality 102 in an authenticated manner, the third telecommunications network 300 is configured to use a domain and/or host name resolver entity or functionality 501, and the method comprises the following steps:

- in a step E, the visited telecommunications network 300 receives, from the user equipment 20, a message containing subscription concealed identifier information and/or routing indicator information,
- in a step F, the visited telecommunications network 300 requests the domain and/or host name resolver entity or functionality 501 to resolve the second domain and/or host name 202' and includes the routing indicator information in the resolve request,
- in a step G, the domain and/or host name resolver entity or functionality 501 returns an address related to the first secure edge protection proxy entity or functionality 102,
- in a step H, the visited telecommunications network 300 forwards a message related to the message received in step E via the first secure edge protection proxy entity or functionality 102.

This is exemplarily shown in FIG. 7 which schematically illustrates a second solution according to the present invention for providing communication services to a user equipment in an exemplary situation such that despite the telecommunications networks communicating via secure edge protection proxy entities or functionalities, an authenticated communication is possible. According to this solution, the visited telecommunications network is configured to use a domain and/or host name resolver entity or functionality, and the additional use of the routing indicator as parameter to the DNS request resolving the FQDN of a secure edge protection proxy entity or functionality. In this case, the IPX's DNS server (domain and/or host name resolver entity or functionality 501) is used by the visited telecommunications network 300 (V-PLMN) to resolve the address of the first secure edge protection proxy entity or functionality 102 (H-SEPP), i.e. "nrf.5gc.mnc03.mcc241.3gppnetwork.org". The DNS request especially contains the FQDN to resolve, i.e., "nrf.5gc.mnc03.mcc241.3gppnetwork.org", as well as the routing indicator information of the subscription concealed identifier. Based on the routing indicator information (i.e. the RI's value/range), the IPX's DNS (domain and/or host name resolver entity or functionality 501) returns a DNS record pointing towards the "normal 241 03 SEPP" or another SEPP instance to serve the given routing indicator range.

This is illustrated via a communication diagram between a consuming network function (e.g. an (or the) access and mobility management function as an example of such a network function 305) of the visited telecommunications network 300, the third secure edge protection proxy entity or functionality 302, the domain and/or host name resolver entity or functionality 501, the second secure edge protection proxy entity or functionality 202, the first secure edge protection proxy entity or functionality 102, the authorization functionality AUSF of the first telecommunications network 100, and the serving network function 105 of the first telecommunications network 100.

In a first processing step 631, the network function 305 receives a request related to a subscription concealed identifier information (related to the user equipment 20) which should be processed in region "X". In a second processing step 632, the network function 305 transmits a signaling message comprising the subscription concealed identifier information as well as an indication of the serving network function, e.g. "ausf.5gc.mnc03.mcc241.3gppnetwork.org". In a third processing step 633, the third secure edge protection proxy entity or functionality 302 determines the DNS resolution for FQDN of the second secure edge protection proxy entity or functionality 202 (i.e. for public land mobile network identifier information "241 03"). In a fourth processing step 634 a DNS request including the routing indicator information of the subscription concealed identifier information and FQDN "sepp.5gc.mnc03.mcc241.3gppnetwork.org" is transmitted, by the third secure edge protection proxy entity or functionality 302, to the domain and/or host name resolver entity or functionality 501. In a fifth processing step 635, in case that the indicated routing indicator information is configured for redirection towards the first telecommunications network 100 (i.e. the "267 01" network), the domain and/or host name resolver entity or functionality 501 returns the IP address pointing to the first secure edge protection proxy entity or functionality 102, i.e. in "region X". In a sixth processing step 636, the domain and/or host name resolver entity or functionality 501 returns the corresponding IP address, pointing to the first secure edge protection proxy entity or functionality, i.e. "in region X" (or in "country X"). In a seventh processing step 637, the third secure edge protection proxy entity or functionality 302 provides for a DNS record caching, taking into account the returned FQDN and the corresponding routing indicator information. In this processing step, DNS records may be cached at the V-SEPP. In order to ensure that a request containing a SUCI is not mapped to a wrong SEPP, DNS cache records must be stored indexed by not only FQDN but also the routing indicator information.

In an eighth processing step 638, the third secure edge protection proxy entity or functionality 302 forwards the request towards the first secure edge protection proxy entity or functionality 102 "in region X". In a ninth processing step 639, this message is forwarded to the authorization functionality AUSF of the first telecommunications network 100. In a tenth processing step 640 the subscription concealed identifier information is decrypted by the authorization functionality AUSF of the first telecommunications network 100. In an eleventh processing step 641, the message response including the subscriber permanent identifier information (i.e. the deconcealed subscription concealed identifier information, or at least part thereof) is transmitted to the first secure edge protection proxy entity or functionality 102, and in a twelfth processing step 642 towards the third secure edge protection proxy entity or functionality 302. In a thirteenth processing step 643, the received subscriber permanent identifier information is mapped, by the third secure edge protection proxy entity or functionality 302, to the routing indicator information in the message of the second processing step 632. The V-SEPP must recognize messaging responses containing SUCI decryption. The V-SEPP must map the received SUCI to its RI value. The reason being that subsequent messages will not contain a SUCI and/or RI but rather a SUPI. Especially, this mapping is necessary so that the correct DNS record is used.

In case that after these preparatory steps and in a fourteenth processing step 644, there is a signaling message being transmitted from the consuming network function 305 to the third secure edge protection proxy entity or functionality 302, the signaling message comprising the subscriber permanent identifier information and an indication to request a service from a network function "X" (e.g. via the indication "nf-x.5gc.mnc03.mcc241.3gppnetwork.org") then the third secure edge protection proxy entity or functionality 302 is able, in a fifteenth processing step 645, to use the DNS cache for the mapped FQDN and routing indicator information or re-request the DNS resolution for the FQDN and the mapped routing indicator information. In a sixteenth processing step 646, the request is forwarded to the first secure edge protection proxy entity or functionality 102 with an endpoint in "region X", i.e. in a seventeenth processing step 647, transmitted to the producing network function 105 of the first telecommunications network 100.

It should be considered that both H-SEPPs (i.e. the first secure edge protection proxy entity or functionality 102 and the second secure edge protection proxy entity or functionality 202) may need to use the same certificate. From the point of view of the V-SEPP (or third secure edge protection proxy entity or functionality 302), both IP endpoints belong to the same SEPP instance (same FQDN).

Figure 8:
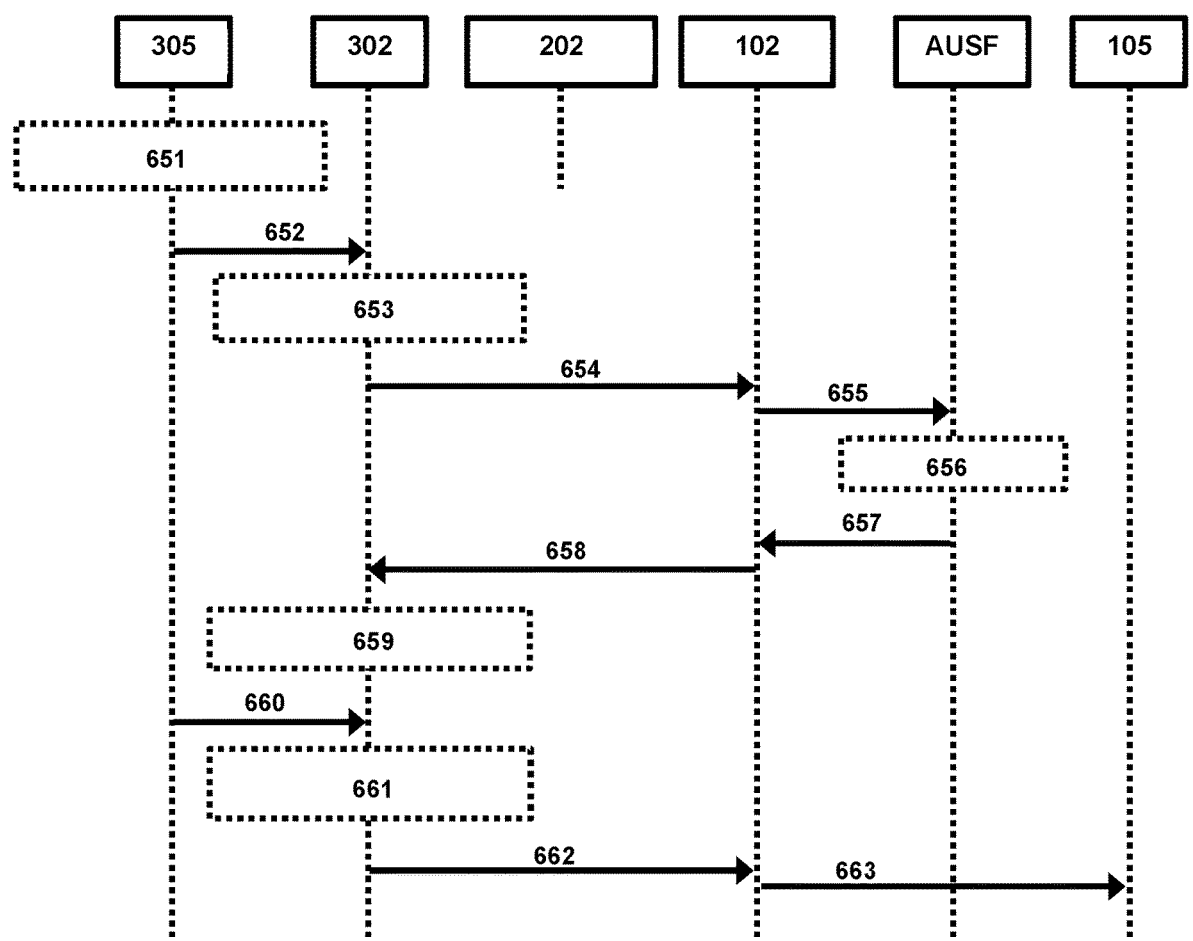
FIG. 8 schematically illustrates a third solution according to the present invention for providing communication services to a user equipment in an exemplary situation such that despite the telecommunications networks communicating via secure edge protection proxy entities or functionalities, an authenticated communication is possible.

In FIG. 8, a third solution according to the present invention is schematically shown for providing communication services to a user equipment in the situation as described—i.e., involving first and second telecommunications networks 100, 200 using or being assigned to, respectively, a first and second network identifier information 101, 201, wherein, in case that the user equipment 20 uses or is connected to an access network 320 of a visited telecommunications network 300, the user equipment 20 uses a user equipment subscription, especially including subscriber permanent identifier information, that is related or assigned to the first telecommunications network 100 while the respective subscription identifier information comprises the second network identifier information—such that despite the telecommunications networks communicating via secure edge protection proxy entities or functionalities, an authenticated communication is possible.

According to a first variant of the third solution or embodiment according to the present invention, in order for the third secure edge protection proxy entity or functionality 302 accessing the first secure edge protection proxy entity or functionality 102 in an authenticated manner, the third secure edge protection proxy entity or functionality 302 accesses the first secure edge protection proxy entity or functionality 102 based on a specific routing indicator information, wherein the specific routing indicator information is part of the request, related to the user equipment 20, received by the network function of the visited telecommunications network 300 in the first step, and triggering a message towards the third secure edge protection proxy entity or functionality 302, wherein a routing-indicator-specific domain and/or host name information related to a secure edge protection proxy entity or functionality additionally comprises, as a part or field thereof, routing indicator information or information derived from the routing indicator, and wherein the first secure edge protection proxy entity or functionality 102 is reachable using a routing-indicator-specific domain and/or host name information having as a part or field thereof the specific routing indicator information or information derived from the routing indicator, wherein the first secure edge protection proxy entity or functionality 102 is reachable, by the third secure edge protection proxy entity or functionality 302, via a first routing-indicator-specific domain and/or host name 102", wherein the first routing-indicator-specific domain and/or host name 102" is related to the second network identifier information 201, wherein in a step K, the visited telecommunications network 300 receives, from the user equipment 20, a message containing subscription concealed identifier information and a routing indicator information corresponding to the specific routing indicator information, in a step L, the visited telecommunications network 300 is configured to use the first routing-indicator-specific domain and/or host name 102" in order to access the first secure edge protection proxy entity or functionality 102.

This first variant of the third solution or embodiment according to the present invention is exemplarily shown in FIG. 8 which schematically illustrates a second solution according to the present invention for providing communication services to a user equipment in an exemplary situation such that despite the telecommunications networks communicating via secure edge protection proxy entities or functionalities, an authenticated communication is possible. According to this solution, explicit support is added for RI-specific FQDNs of secure edge protection proxy entities or functionalities, i.e. basically, the V-PLMN has additional information to construct RI-dependent FQDN. According to the first variant of the third solution or embodiment, a SEPP FQDN is generated that includes the routing indicator information of the SUCI in the request, e.g., a FQDN such as, e.g., "sepp.5gc.ri99.mnc03.mcc241.3gppnetwork.org", potentially requiring to have DNS registers for each RI (100 or 1000 records per SEPP, depending on whether a two- or three-digit RI is used). Hence, the routing indicator-dependent FQDN corresponds to the routing-indicator-specific domain and/or host name information 102" (especially related to a secure edge protection proxy entity or functionality such as the first secure edge protection proxy entity or functionality 102; this is schematically hinted at via reference sign 102" in FIG. 3) and—in addition to, e.g., the content or parts of the first domain and/or host name 102'—comprises the ".ri99."-part as routing indicator information that is a part or field of the routing-indicator-specific domain and/or host name information (or of the routing indicator-dependent FQDN). Alternatively (or cumulatively) to the routing indicator information ".ri99.", the routing-indicator-specific domain and/or host name information comprises an information derived from the routing indicator, e.g. the ".iot." part in "sepp.5gc.iot.mnc03.mcc241.3gppnetwork.org".

This is illustrated via a communication diagram between a consuming network function (e.g. an (or the) access and mobility management function as an example of such a network function 305) of the visited telecommunications network 300, the third secure edge protection proxy entity or functionality 302, the second secure edge protection proxy entity or functionality 202, the first secure edge protection proxy entity or functionality 102, the authorization functionality AUSF of the first telecommunications network 100, and the serving network function 105 of the first telecommunications network 100.

In a first processing step 651, the network function 305 receives a request related to a subscription concealed identifier information (related to the user equipment 20) with a routing indicator information, e.g. "RI=99". In a second processing step 652, the network function 305 transmits a signaling message comprising the subscription concealed identifier information as well as an indication of the serving network function, e.g. "ausf.5gc.mnc03.mcc241.3gppnetwork.org". In a third processing step 653, the third secure edge protection proxy entity or functionality 302 constructs the FQDN based on the network identifier information (or public land mobile network identifier information) and the routing indicator information if supported. In a fourth processing step 654 the third secure edge protection proxy entity or functionality 302 transmits or forwards the request towards the first secure edge protection proxy entity or functionality 102, and in a fifth processing step 655 towards the authorization functionality AUSF of the first telecommunications network 100. In a sixth processing step 656, the subscription concealed identifier information is decrypted by the authorization functionality AUSF of the first telecommunications network 100. In a seventh processing step 657, the message response including the subscriber permanent identifier information (i.e. the deconcealed subscription concealed identifier information, or at least part thereof) is transmitted to the first secure edge protection proxy entity or functionality 102, and in an eighth processing step 658 towards the third secure edge protection proxy entity or functionality 302. In a ninth processing step 659, the received subscriber permanent identifier information is mapped, by the third secure edge protection proxy entity or functionality 302, to the routing indicator information in the message of the second processing step 652. The V-SEPP must recognize messaging responses containing SUCI decryption. The V-SEPP must map the received SUCI to its RI value. The reason being that subsequent messages will not contain a SUCI and/or RI but rather a SUPI. Especially, this mapping is necessary so that the correct FQDN and as such, the correct DNS record is used.

In case that after these preparatory steps and in a tenth processing step 660, there is a signaling message being transmitted from the consuming network function 305 to the third secure edge protection proxy entity or functionality 302, the signaling message comprising the subscriber permanent identifier information and an indication to request a service from a network function "X" (e.g. via the indication "nf-x.5gc.mnc03.mcc241.3gppnetwork.org") then the third secure edge protection proxy entity or functionality 302 is able, in an eleventh processing step 661, to use the mapping between, on the one hand, the subscriber permanent identifier information, and, on the other hand, the routing indicator information, and forward to secure edge protection proxy FQDN based on the network identifier information (or public land mobile network identifier information) and routing indicator information. In a twelfth processing step 662, the request is forwarded to the first secure edge protection proxy entity or functionality 102, and in a thirteenth processing step 663, transmitted to the producing network function 105 of the first telecommunications network 100.

The SUPI being initially sent in the registration procedure encrypted (SUCI) towards the V-PLMN, wherein the following information is visible in the SUCI:

PLMN ID (PLMN ID-A)

Routing Indicator (RI) with value X (RI-X)

The first secure edge protection proxy entity or functionality 102 is reachable via a FQDN containing the respective routing indicator information "RI-X" (first variant of the third solution or embodiment) or via a specific FQDN in a list of RI ranges and matching FQDN; in this case, the generated FQDN may not contain the RI but rather a given FQDN (second variant of the third solution or embodiment). Especially, the third secure edge protection proxy entity or functionality 302 is able to construct a SEPP FQDN based on the network identifier information of the second telecommunications network 200 and the respective routing indicator information "RI-X" in the received requests.

According to a second variant of the third solution or embodiment according to the present invention, in order for the third secure edge protection proxy entity or functionality 302 accessing the first secure edge protection proxy entity or functionality 102 in an authenticated manner, the third secure edge protection proxy entity or functionality 302 receives or is able to access secure edge protection proxy information, especially comprising addressing and/or domain name information containing a list of routing indicators and/or routing indicator ranges and corresponding to related domain and/or host names, wherein the first secure edge protection proxy entity or functionality 102 is reachable, by the third secure edge protection proxy entity or functionality 302, via a fourth domain and/or host name 102''', wherein the fourth domain and/or host name 102' is related to the second network identifier information 201 and one or more routing indicators and/or routing indicator ranges, in a step M, the visited telecommunications network 300 receives from the user equipment 20 a message containing subscription concealed identifier information and a routing indicator, wherein the secure edge protection proxy information corresponds to the fourth domain and/or host name 102''' and one or more routing indicators and/or routing indicator ranges in a step N, the visited telecommunications network 300 is configured to use the fourth domain and/or host name 102''' (this is schematically hinted at via reference sign 102''' in FIG. 3) in order to access the first secure edge protection proxy entity or functionality 102. Hence, according to the second variant of the third solution or embodiment of the present invention, secure edge protection proxy information (especially comprising addressing and/or domain name information containing a list of routing indicators and/or routing indicator ranges and corresponding to related domain and/or host names) is used that needs to be distributed or disseminated.

Especially the same dissemination forms as of the first solution or embodiment (cf. FIGS. 4 and 5) is used, such that the following SEPP metadata (or secure edge protection proxy information) for a given PLMN (or network) is able to be provided to (or accessed by) the respective V-PLMN (i.e. the visited telecommunications network 300):

Addition of a support indication of RI-specific SEPP FQDNs in the SEPP metadata (same dissemination forms as in Solution 1). If the RI-specific FQDN cannot be resolved (e.g. by the DNS), the V-PLMN can construct a H-SEPP FQDN based on the well-known FQDN without the addition of RI information (e.g. "sepp.5gc.mnc<MNC>.mcc<MCC>.3gppnetwork.org")

List of RI and/or RI ranges and matching FQDN. For a RI mapping not contained in the SEPP metadata, the V-PLMN can construct a H-SEPP FQDN based on the well-known FQDN without the addition of RI information (e.g. "sepp.5gc.mnc<MNC>.mcc<MCC>.3gppnetwork.org").

Basically, the V-PLMN has additional information to construct RI-dependent FQDN, especially via explicitly listing in the SEPP metadata Ms and/or RI ranges and a matching SEPP FQDN, e.g. including in the SEPP metadata that Ms 00-98 should use "sepp.5gc.mnc03.mcc241.3gpp-network.org" (the "generic SEPP") and RI 99 should use "sepp.5gc.iot.mnc03.mcc241.3gppnetwork.org" (a specific FQDN that may or may not contain a RI) or "sepp.5gc.mnc01.mcc267.3gppnetwork.org" (a specific FQDN that may not even share the same HND).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing communication services to a user equipment, comprising:
    obtaining, by a visited telecommunications network, secure edge protection proxy (SEPP) information indicating that redirection of messages is allowed from a first telecommunications network having first network identifier information to a second telecommunications network having second network identifier information and/or from the second telecommunications network to the first telecommunications network;
    receiving, by a network function of the visited telecommunications network, a request related to the user equipment, wherein the user equipment is in a roaming situation in which the user equipment's home network is the first telecommunications network but the user equipment is using the second network identifier of the second telecommunication network while roaming in the visited telecommunications network, and wherein the received request triggers a message towards a visited SEPP (V-SEPP) of the visited telecommunication network;
    accessing, by the V-SEPP of the visited telecommunications network, a first home SEPP (H-SEPP) of the first telecommunications network in an authenticated manner such that a message related to the second network identifier information of the second telecommunications network is able to be sent, based on the SEPP information, by the visited telecommunications network, to a network function in the first telecommunications network and accepted by the first telecommunications network;
    sending, by the user equipment, messages towards the visited telecommunications network, wherein the messages include:
        the subscriber permanent identifier information of the user equipment; or
        subscription-concealed identifier information containing information derived from the subscriber permanent identifier of the user equipment; and
    forwarding, via a bidirectional channel, the messages from the visited telecommunications network to the first telecommunications network, wherein:
        the bidirectional channel is between the V-SEPP and the first H-SEPP; or
        the bidirectional channel is between the V-SEPP and both of the first H-SEPP of the first telecommunications network and a second H-SEPP of the second telecommunications network.

2. The method according to claim 1, wherein the first H-SEPP is reachable by the V-SEPP via a first domain and/or a first host name related to the first network identifier information;
    wherein the second H-SEPP is reachable, by the V-SEPP via a second domain and/or a second host name related to the second network identifier information;
    wherein a specific network function in the first telecommunications network is reachable, by a consumer network function in the visited telecommunications network, via a further first domain and/or a further first host name related to the specific network function and the first network identifier information;
    wherein a further specific network function in the second telecommunications network is reachable, by a consumer network function in the visited telecommunications network, via a further second domain and/or a further second host name related to the further specific network function and the second network identifier information,
    wherein in order to provide the communication services to the user equipment using service-based interfaces and/or a network repository function, a network function service is requested and/or provided, by the specific network function of the first telecommunications network, to the consumer network function of the visited telecommunications network.

3. The method according to claim 1, wherein the request related to the user equipment is triggered by the user equipment accessing the visited telecommunications network for connection thereto.

4. The method according to claim 1, wherein, in order for the V-SEPP to access the first H-SEPP in an authenticated manner, prior to the first H-SEPP being accessed by the V-SEPP, the V-SEPP accesses the second H-SEPP related to the user equipment, via transmitting a network function discovery query message to the second H-SEPP,
    wherein the second H-SEPP transmits an indication that the first H-SEPP is to be accessed regarding the requested network function, wherein the second telecommunications network comprises a network repository function related to the second network identifier information, and
    wherein the method further comprises the following steps:
        in a step A, the visited telecommunications network receives, from the user equipment, a message containing subscription concealed identifier information and/or routing indicator information;

in a step B, the visited telecommunications network queries the network repository function for a network function capable of deconcealing the received concealed identifier information and/or routing indicator information;

in a step C, the network repository function returns information related to the specific network function and including a further first domain and/or a further first host name related to the first network identifier information; and in a step D, the visited telecommunications network is configured to forward, based on the first network identifier information contained within the further first domain and/or the further first host name, a message containing the subscription concealed identifier information and/or the routing indicator information to the specific network function while this message contains a subscription concealed identifier information and/or a routing indicator information related to the second network identifier information.

5. The method according to claim 1, wherein the SEPP information comprises:

an allow redirection-to-indication containing network identifier information and/or domain and/or host name information regarding the first H-SEPP and/or the second H-SEPP and/or regarding the first telecommunication network and/or the second telecommunication network, and/or an allow-redirection-from-indication containing network identifier information and/or domain and/or host name information regarding the first H-SEPP and/or the second H-SEPP and/or regarding the first telecommunication network and/or the second telecommunications network;

wherein the secure edge protection proxy information is accessed from an SEPP metadata repository in case that:

the allow-redirection-to-indication from the second H-SEPP secure edge protection proxy entity or functionality includes the first network identifier information and/or domain and/or host name information related to the first telecommunications network, or the allow-redirection-from-indication from the first H-SEPP includes the second network identifier information and/or domain and/or host name information related to the second telecommunications network, or both the allow-redirection-to-indication from the second H-SEPP includes the first network identifier information and/or domain and/or host name information related to the first telecommunications network and the allow-redirection-from-indication from the first H-SEPP includes the second network identifier information, and/or domain and/or host name information related to the second telecommunications network.

6. The method according to claim 1, wherein, in order for the third V-SEPP to access the first H-SEPP in the authenticated manner, the visited telecommunications network is configured to use a domain and/or host name resolver entity or functionality, and the method further comprises the following steps:

in a step E, the visited telecommunications network receives, from the user equipment, a message containing subscription concealed identifier information and/or routing indicator information;

in a step F, the visited telecommunications network requests the domain and/or host name resolver entity or functionality to resolve the second domain and/or host name and includes the routing indicator information in the resolve request;

in a step G, the domain and/or host name resolver entity or functionality returns an address related to the first H-SEPP; and in a step H, the visited telecommunications network forwards a message related to the message received in step E via the first H-SEPP.

7. The method according to claim 1, wherein, in order for the V-SEPP to access the first H-SEPP in the authenticated manner, the V-SEPP accesses the first H-SEPP based on a specific routing indicator information, wherein the specific routing indicator information is part of the request, related to the user equipment, and triggers a message towards the V-SEPP, wherein a respective routing-indicator-specific domain and/or respective host name information related to a respective SEPP additionally comprises, as a part or field thereof, respective routing indicator information or respective information derived from a respective routing indicator, and wherein the first H-SEPP is reachable using a first routing-indicator-specific domain and/or first host name information having as a part or field thereof first specific routing indicator information or first information derived from a first routing indicator, wherein the first H-SEPP is reachable, by the V-SEPP via the first routing-indicator-specific domain and/or a first host name, wherein the first routing-indicator-specific domain and/or the first host name is related to the second network identifier information, wherein the method further comprises:

in a step K, the visited telecommunications network receives, from the user equipment, a message containing subscription concealed identifier information and routing indicator information corresponding to the specific routing indicator information; and in a step L, the visited telecommunications network is configured to use the first routing-indicator-specific domain and/or the first host name in order to access the first H-SEPP.

8. The method according to claim 1, wherein the SEPP information comprises addressing and/or domain name information containing a list of routing indicators and/or routing indicator ranges and corresponding to related domain and/or host names, wherein the first H-SEPP is reachable, by the V-SEPP, via a fourth domain and/or a fourth host name, wherein the fourth domain and/or the fourth host name is related to the second network identifier information and one or more routing indicators and/or routing indicator ranges, wherein the method further comprises:

in a step M, the visited telecommunications network receives from the user equipment a message containing subscription concealed identifier information and a routing indicator, wherein the SEPP information corresponds to the fourth domain and/or the fourth host name and the one or more routing indicators and/or routing indicator ranges, and wherein in a step N, the visited telecommunications network is configured to use the fourth domain and/or the fourth host name in order to access the first H-SEPP.

9. The method according to claim 1, wherein respective network identifier information comprises a respective mobile country code, a respective mobile network code, and/or a respective network identifier.

10. The method according to claim 1, wherein the method further comprises:
- in a step O, the visited telecommunications network forwards towards the first telecommunications network a message containing subscription concealed identifier information and/or a routing indicator;
- in a step P, the first telecommunications network returns deconcealed subscriber permanent identifier information comprising the second network identifier information;
- in a step Q, the V-SEPP maps the returned deconcealed subscriber permanent identifier information to the first H-SEPP based on a stored mapping between the deconcealed subscriber permanent identifier information and the first domain and/or host name, the routing indicator, and/or a resolved address;
- in a step R, the visited telecommunications network receives a message containing a previously mapped subscriber permanent identifier information comprising the second network identifier information; and
- in a step S, the V-SEPP sends the message via the first H-SEPP based on the stored mapping.

11. The method according to claim 1, wherein the messages sent by the user equipment towards the visited telecommunications network include the subscription-concealed identifier information; and
- wherein the method further comprises: performing, by the first telecommunications network, deconcealment of the subscription concealed identifier information into the subscriber permanent identifier information.

12. A system, comprising:
- a user equipment;
- a first telecommunications network having first network identifier information and a first home secure edge protection proxy (H-SEPP);
- a second telecommunications network having first network identifier information and a second H-SEPP; and
- a visited telecommunications network having a visited secure edge protection proxy (V-SEPP), wherein the visited telecommunications network is configured to obtain secure edge protection proxy (SEPP) information indicating that redirection of messages is allowed from the first telecommunications network to the second telecommunications network and/or from the second telecommunications network to the first telecommunications network;
- wherein a network function of the visited telecommunications network is configured to receive a request related to the user equipment, wherein the user equipment is in a roaming situation in which the user equipment's home network is the first telecommunications network but the user equipment is using the second network identifier of the second telecommunication network while roaming in the visited telecommunications network, and wherein the received request is configured to trigger a message towards the V-SEPP;
- wherein the V-SEPP of the visited telecommunications network is configured to access the first H-SEPP of the first telecommunications network in an authenticated manner such that a message related to the second network identifier information of the second telecommunications network is able to be sent, based on the SEPP information, by the visited telecommunications network, to a network function in the first telecommunications network and accepted by the first telecommunications network;
- wherein the user equipment is configured to send messages towards the visited telecommunications network, wherein the messages include:
  - the subscriber permanent identifier information of the user equipment; or
  - subscription-concealed identifier information containing information derived from the subscriber permanent identifier of the user equipment; and
- wherein the system is configured for forwarding, via a bidirectional channel, the messages from the visited telecommunications network to the first telecommunications network, wherein:
  - the bidirectional channel is between the V-SEPP and the first H-SEPP; or
  - the bidirectional channel is between the V-SEPP and both of the first H-SEPP of the first telecommunications network and a second H-SEPP of the second telecommunications network.

13. One or more non-transitory computer-readable mediums having processor-executable instructions stored thereon for providing communication services to a user equipment, wherein the processor-executable instructions, when executed, facilitate performance of the following:
- obtaining, by a visited telecommunications network, secure edge protection proxy (SEPP) information indicating that redirection of messages is allowed from a first telecommunications network having first network identifier information to a second telecommunications network having second network identifier information and/or from the second telecommunications network to the first telecommunications network;
- receiving, by a network function of a visited telecommunications network, a request related to the user equipment, wherein the user equipment is in a roaming situation in which the user equipment's home network is the first telecommunications network but the user equipment is using the second network identifier of the second telecommunication network while roaming in the visited telecommunications network, and wherein the received request triggers a message towards a visited SEPP (V-SEPP) of the visited communication network;
- accessing, by the V-SEPP of the visited telecommunications network, a first home SEPP (H-SEPP) of the first telecommunications network in an authenticated manner such that a message related to the second network identifier information of the second telecommunications network is able to be sent, based on the SEPP information, by the visited telecommunications network, to a network function in the first telecommunications network and accepted by the first telecommunications network;
- sending, by the user equipment, messages towards the visited telecommunications network, wherein the messages include:
  - the subscriber permanent identifier information of the user equipment; or
  - subscription-concealed identifier information containing information derived from the subscriber permanent identifier of the user equipment; and
- forwarding, via a bidirectional channel, the messages from the visited telecommunications network to the first telecommunications network, wherein:
  - the bidirectional channel is between the V-SEPP and the first H-SEPP; or
  - the bidirectional channel is between the V-SEPP and both of the first H-SEPP of the first telecommunications network and a second H-SEPP of the second telecommunications network.

* * * * *